(12) United States Patent
Amacker

(10) Patent No.: US 9,875,284 B1
(45) Date of Patent: Jan. 23, 2018

(54) DISPLAYING SEARCH COMPLETION RESULTS

(75) Inventor: Matthew Warren Amacker, Santa Clara, CA (US)

(73) Assignee: A9.com, Inc., Palo Alto, CA (US)

( * ) Notice: Subject to any disclaimer, the term of this patent is extended or adjusted under 35 U.S.C. 154(b) by 0 days.

(21) Appl. No.: 13/526,233

(22) Filed: Jun. 18, 2012

(51) Int. Cl.
*G06F 17/30* (2006.01)
*G06Q 30/06* (2012.01)

(52) U.S. Cl.
CPC .... *G06F 17/3053* (2013.01); *G06F 17/30672* (2013.01); *G06F 17/3097* (2013.01); *G06F 17/30864* (2013.01); *G06Q 30/0625* (2013.01)

(58) Field of Classification Search
CPC ......... G06F 17/30873; G06F 17/30864; G06F 17/3097; G06F 17/3053; G06F 17/30672; G06Q 30/0625
USPC ......................................................... 707/767
See application file for complete search history.

(56) References Cited

U.S. PATENT DOCUMENTS

| | | | |
|---|---|---|---|
| 2003/0030678 A1* | 2/2003 | Rosenholtz | G06F 17/30855 715/838 |
| 2004/0098315 A1* | 5/2004 | Haynes | G06Q 30/06 705/80 |
| 2005/0033664 A1* | 2/2005 | Moon | G06Q 30/02 705/26.62 |
| 2005/0251456 A1* | 11/2005 | Perkowski | G06Q 30/02 705/26.62 |
| 2007/0061317 A1* | 3/2007 | Ramer | G06F 17/30864 |
| 2007/0162298 A1* | 7/2007 | Melton | G06F 17/30864 715/234 |
| 2007/0198655 A1* | 8/2007 | Stuckman | G06F 17/30873 709/217 |
| 2011/0093488 A1* | 4/2011 | Amacker | G06F 17/30873 707/767 |
| 2011/0238656 A1* | 9/2011 | Hood | G06F 17/30864 707/722 |
| 2012/0030226 A1* | 2/2012 | Holt | G06F 17/30672 707/766 |
| 2012/0047134 A1* | 2/2012 | Hansson | G06F 17/3064 707/731 |
| 2012/0265756 A1* | 10/2012 | Ryan | G06F 17/30864 707/725 |

(Continued)

*Primary Examiner* — Wei Zhen
*Assistant Examiner* — Mohammed Huda
(74) *Attorney, Agent, or Firm* — Hogan Lovells US LLP

(57) ABSTRACT

The present technology relates to methods, systems and computer program products for displaying search completion results. A chalkboard interface having search completion results can be displayed in response to inputs entered in a search field of a webpage. One or more search completion options, such as predicted search queries, can be generated based at least on the inputs. The search completion options and corresponding search results can be displayed in the chalkboard interface. If further inputs are entered in the search field, the search completion options are modified, resulting in a dynamic chalkboard interface that displays search completion options with corresponding search results that change with each keystroke or input inputted at the search field. The chalkboard interface can be superimposed over the webpage, except for the search field, so that as inputs are entered in the search field, the search completion options and search results are accordingly modified.

22 Claims, 10 Drawing Sheets

(56) References Cited

U.S. PATENT DOCUMENTS

2012/0265784 A1* 10/2012 Hsu .................... G06F 17/3064
707/771

* cited by examiner

DISPLAYING SEARCH COMPLETION RESULTS

BACKGROUND

Some applications such as web browsers, email programs, search engine interfaces, word processors, and database query tools include an autocomplete feature. The autocomplete feature attempts to predict words or phrases that a user wants to type without the user typing the word or phrase completely. In one conventional application having the autocomplete feature, the autocomplete feature displays predicted words or phrases as the user types. If the predicted word of phrase matches the one the user wanted to type, the user can select the predicted word or phrase.

Another autocomplete feature specific to search engines includes a search suggest drop-down list. As the user begins typing a search query into the search engine, a drop-down list is displayed with the suggested complete search queries based on what the user has started to type. The list is typically based on popular searches. The user can then select one of the suggested complete search queries or continue typing out the desired search query. With such a conventional search suggest drop-down list, the user is only provided the suggested search queries but not the search results associated with the suggested search queries.

BRIEF DESCRIPTION OF THE DRAWINGS

The embodiments of the present technology will hereinafter be described in conjunction with the appended drawings, provided to illustrate and not to limit the technology, wherein like designations denote like elements, and in which.

DETAILED DESCRIPTION OF THE TECHNOLOGY

Figure 1:
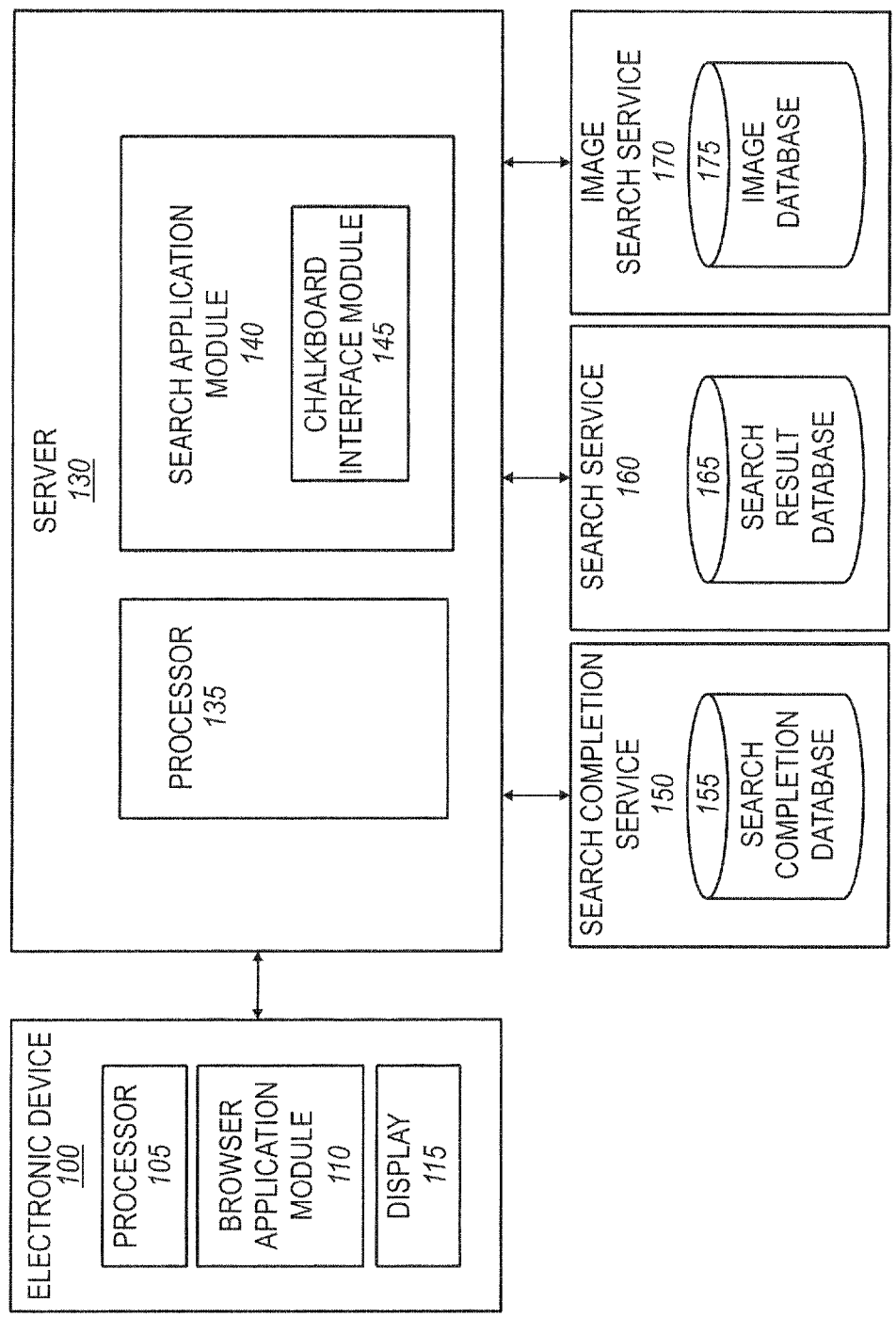
FIG. 1 is a block diagram of a system for displaying search completion results in accordance with an example embodiment of the present technology.

Various embodiments of the present technology relate to methods, systems and computer program products for search completion results.

The present technology relates to methods, systems and computer program products for displaying search completion results. One non-limiting example includes displaying search completion results in a graphical user interface (GUI), such as a chalkboard interface. The chalkboard interface having search completion results can be displayed in response to inputs entered in a search field (for example, a search interface element) of a webpage. One or more search completion options, such as predicted search queries, can be generated based at least in part on the inputs. The search completion options can correspond to a search query capable of being entered into the search interface element starting with the input (for example, a text input) entered at the search field. The search completion options and corresponding content objects (for example, search results resulting from a search executed using the search completion option) can be displayed in the GUI. If further inputs are entered in the search field, the search completion options are modified in response, resulting in a dynamic GUI that displays search completion options along with their corresponding search results that change with each keystroke or input inputted at the search field. Thus, the GUI can supplement autocomplete or search completion options, such as those used with search engines.

As discussed above, conventional search engines included search suggest drop-down lists which provided or suggested complete search queries as the user began typing a search query into the search engine. However, such conventional search suggest drop-down lists provided only the suggested search query but did not provide a preview of the search results associated with the suggested search query. Instead, users had to actively select one of the suggested search queries to execute the search of the suggested search query. After the suggested search query was executed, a user could then view the corresponding search results to determine if the corresponding search results are related to the user's desired or intended search query.

For example, if the user desires to search for results relating to dog parks and begins typing the term "dog park" into the search engine (for example, when the user begins typing the characters "dog"), a search suggest drop-down list can be displayed including the complete search queries "dog run," "dog food," "veterinarians," "dog daycares," "dog trails," and "dog play areas." While the suggested search queries "dog run," "dog daycare," "dog trails," and "dog play areas" might include corresponding search results that could be pertinent to the user's intended search query or that could be of importance to the user, the user has to select each of the search queries individually to execute each search query individually. After executing one of the search queries, the user can then view the corresponding search results associated therewith. However, the user must execute each search query in order to view the corresponding search results. Accordingly, there has been a need for a user-intuitive, visually-appealing, and efficient search feature that allows users to quickly obtain relevant search results associated with the user's intended search query which the presently disclosed methods, systems, and computer program products for displaying search completion results provides.

Several definitions that apply throughout this document will now be presented.

As will be used in the following disclosure, the phrase "completion option" refers to a suggested or predicted autocomplete text option. For example, one or more autocomplete terms suggested based on at least one text input entered by a user. The completion option can be determined using a predictive algorithm (such as algorithms associated with autocomplete systems, search as you type systems, filter/find as you type (FAYT) systems, incremental search systems, or other predictive or autocomplete systems) that are based on at least one text input entered by a user.

The phrase "search completion option" refers to a suggested search query or a predicted search query. For example, a search query search term suggested based on at least one input entered by a user in a search field or any other search interface element. The search completion option can include one or more previously-searched search terms, one or more frequently-searched search terms, and one or more search terms determined using a predictive algorithm (such as algorithms associated with autocomplete systems, search as you type systems, filter/find as you type (FAYT) systems, incremental search systems, or other predictive or autocomplete systems) that are based on at least one input entered by a user in a search field.

The phrase "chalkboard interface" refers to an interface which can be displayed on a display of an electronic device. The chalkboard interface can be superimposed over an underlying interface, can replace a current GUI, or can be presented in a new GUI. In one non-limiting example, the chalkboard interface can be displayed over or superimposed over an underlying interface (for example, a search browser or a webpage). For example, the chalkboard interface can be cascading style sheets (CSS), an interface layer, or a black division (DIV) which is superimposed of an underlying interface and which interrupts events, inputs, and cursor interactions associated with the underlying interface, or any other interface which can be layered or superimposed over another interface. Those of ordinary skill in the art however will appreciate that the chalkboard interface does not necessarily have to be a superimposable, semi-transparent, or partially transparent interface.

The phrase "communicatively coupled" is defined as connected, whether directly or indirectly through intervening components and is not necessarily limited to physical connections. Coupled devices are devices which are in signal communication with one another.

The phrase "electronic device" is defined as any device that is capable of at least accepting data, transmitting data, and executing commands. For example, electronic devices can include, but are not limited to, portable communication devices, mobile communication devices, mobile computers, smartphones, computing pads, tablet computers, personal computers, desktop computers, laptop computers, netbooks, servers, routers, set-top phones, or other electronic devices capable of at least accepting data, transmitting data, and executing commands.

In one non-limiting example of a method of displaying search completion results (in other words search results associated with search completion options), an electronic device can have a web browser displaying a webpage with a search field (or any other search interface element). A server communicatively coupled to the electronic device can receive, from the electronic device, a first input associated with the search field of the webpage. The first input can be a first keystroke associated with a user's desired search query and corresponding to one or more first characters of the user's desired search query. The server can be communicatively coupled to a search completion service which can determine or suggest search completion options based on search terms or search inputs. In response to receiving the first input, the server can transmit, to a search completion service, the first input. The server can receive, from the search completion service, one or more search completion options based at least in part on the first input. The server can generate first search results for each of the one or more search completion options. The server can retrieve images for each of the first search results. Each image representing a corresponding search result. The server can transmit, to the electronic device, a chalkboard interface. The chalkboard interface can be superimposed over at least a portion of the webpage except for the search field. The chalkboard interface can include: the first search results and the images associated with the first search results. The server can receive, from the electronic device, a second input associated with the search field. For example, the second input can be associated with the first input. In one example, the second input can be a second keystroke or a second search term appended to the first input. That is, the second input can be a second keystroke or a second search term that narrows or refines the first input. The server can transmit, to the search completion service, the second input. The server can receive, from the search completion service, one or more modified search completion options based at least in part on the second input. The server can generate second search results for each of the one or more modified search completion options. The sever can then modify the chalkboard interface based at least in part on the second search results to yield modified search results. The server can also transmit instructions to the electronic device to display the modified chalkboard interface or can transmit instructions to the electronic device to modify the chalkboard with the modified search results.

Details pertaining to methods, systems and computer program products for displaying search completion results will be described in further detail below and will reference FIGS. 1-10. While FIGS. 1-9 illustrate a server-based method and system for displaying search completion results, those of ordinary skill in the art will appreciate that the method and system for displaying search completion results can be performed at the client device. For example, as will be described in relation to FIG. 10.

FIG. 1 is a block diagram of a non-limiting example of a system for displaying search completion results. FIG. 1 includes an electronic device 100 communicatively coupled to a server 130.

The electronic device 100 can include, but is not limited to, a portable communication device, a mobile communication device, a mobile computer, a smartphone, a computing pad, a tablet computer, a personal computer, a desktop computer, a laptop computer, a netbook, or any other electronic device capable of at least accepting data, transmitting data, and executing commands associated with a search feature of the electronic device 100 or an application of the electronic device 100.

In FIG. 1, the electronic device 100 can include a processor 105. The processor 105 can be communicatively coupled to the electronic device 100. The processor 105 can include one or more processors. In other embodiments, the processor 105 can be a processing system, a computing system, or any other system that is communicatively coupled to the electronic device 100 that can receive and process search requests or search inputs entered at the electronic device 100 (for example, entered using an input interface (not shown) of the electronic device 100).

The electronic device 100 can include one or more application modules 110 that are communicatively coupled with the processor 105. In FIG. 1, the application module can be a browser application module 110, a web browser application, a search application, a database application, or any other module by which the user can enter search requests or search inputs for content or search results. Those of ordinary skill in the art will appreciate that such modules can control or be configured to control the processor 105 to perform various actions. The module 110 can be located in local storage devices (not shown), remote storage devices (not shown), or both local and remote storage devices communicatively coupled to the electronic device 100.

In FIG. 1, the electronic device 100 can include a display 115 on which graphical information can be displayed. The display 115 can be a touchscreen display, a liquid crystal display (LCD), a light emitting diode display (LED), an active matrix organic light emitting diode display (AMO-LED), or any other display on which graphical information can be displayed. In FIG. 1, the display 115 can be configured to display search results, web content, overlay interfaces (such as chalkboard interfaces), or any other graphical information associated with search completion results.

As illustrated in FIG. 1, the electronic device 100 can be communicatively coupled to the server 130 via a communication interface (not shown). The communication interface can include a peer-to-peer (P2P) interface, a Bluetooth® interface, a near-field-communication (NFC) interface, a near-field-communication-peer-to-peer (NFC P2P) interface, a Wi-Fi interface, an internet-interface, or any other interface which allows the electronic device 100 to transmit and receive information from the server 130.

Figure 4:
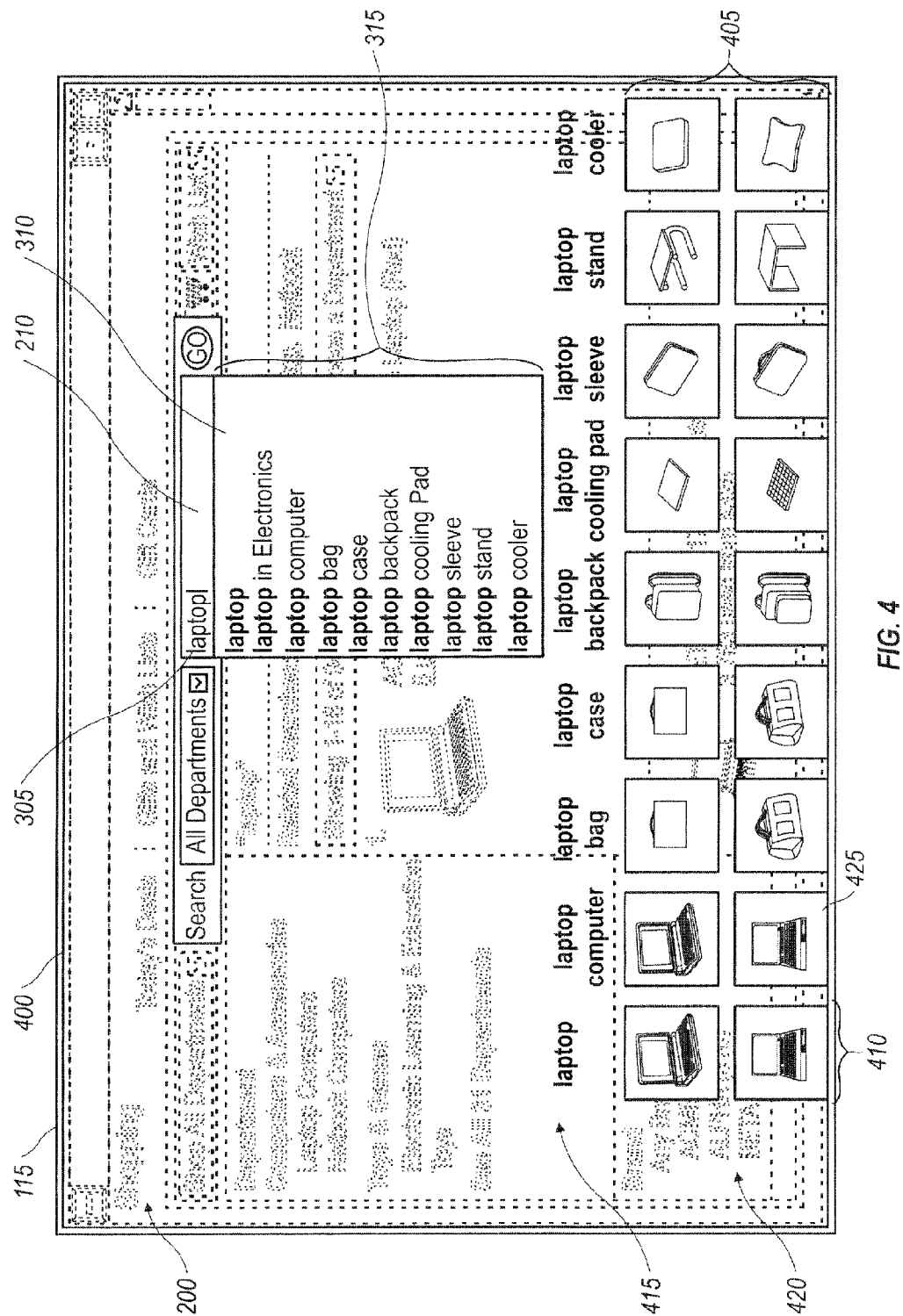
FIG. 4 is an illustration of graphical user interface (GUI), such as a chalkboard interface, superimposed over the webpage in response to the entered search input illustrated in FIG. 3 in accordance with an example embodiment of the present technology.

The server 130 can be a web-based server, a cloud-based server, a network-based server, a system of servers or any other server or servers. The server 130 can be associated with a computer system configured to generate a chalkboard interface 400 (illustrated in FIG. 4). In FIG. 4, the server 130 can include a processor 135. The processor 135 can be communicatively coupled to the server 130. The processor 135 can include one or more processors. In other embodiments, the processor 135 can be a processing system, a computing system, or any other system that is communicatively coupled to the server 130 that can receive and process search requests or search inputs from the electronic device 100 and can transmit at least one of search results, images, search completion options, of a chalkboard interface comprising any one of search results, images, search completion options to the electronic device 100.

In FIG. 1, the server 130 can include a search application module 140. The search application module 140 can be a server-based search engine application, a server-based script associated with a search engine or a webpage, a web-based application, or any other application which can receive and process search requests or search inputs from the electronic device 100 and transmit search results corresponding to the search requests or search inputs of the electronic device 100. Those of ordinary skill in the art will appreciate that such modules can control or be configured to control the processor 135 to perform various actions. The module 140 can be located in local storage devices (not shown), remote storage devices (not shown), or both local and remote storage devices communicatively coupled to the server 130.

In FIG. 1, the search application module 140 can include a chalkboard interface module 145. The chalkboard interface module 145 can be an application module which generates search completion options, generates search results corresponding to the search completion options, retrieve detailed information associated with search results, and generates an overlay interface (such as a chalkboard interface 400 as illustrated in FIG. 4) comprising search completion options, search results, associated detailed information, or any other information associated with search completion options or search results associated with search requests or search inputs received from the electronic device 100. The search completion options can be generated using predictive algorithms as discussed above. The search completion options can also be retrieved from one or more databases or database systems (not shown) communicatively coupled to the server 130. Similarly, the search results, detailed information associated with the search results, and images associated with the search results can be retrieved and generated from the same database system from which the search completion options are generated or other database systems communicatively coupled to the serve 130.

As will be described in further detail below, the chalkboard interface 400 can be a user interface on which at least search completion options and their corresponding search results can be displayed. The chalkboard interface 400 can be, but does not necessarily need to be, an interface overlaid or superimposed on a graphical user interface displayed on the display 115 of the electronic device 100. The chalkboard interface 400 can be generated at the server 130 (for example, by the processor 135 of the server 130). In other embodiments, the server 130 can transmit instructions to the electronic device 100 which can be executed by the processor 105 of the electronic device 100 to overlay or superimpose the chalkboard interface 400 on top of or over a graphical user interface (GUI) (for example a web browser GUI, a webpage, a website, or a search application GUI). The chalkboard interface module 145 can also be configured to modify the chalkboard interface 400 in response to any subsequent or further search requests, search inputs, or search refinements received from the electronic device 100.

As discussed above, in one embodiment, the search application module 140 can generate the search completion options, search results, detailed information, and images associated with search results. In other embodiments, the search application module 140 or the server 130 can retrieve search completion options from a search completion service 150; retrieve search results and/or detailed information associated with search results from a search service 160; and retrieve images from an image service 170.

The search completion service 150 can include a search completion database 155 from which search completion options associated with search requests or search inputs from the electronic device 100 can be selected, retrieved, and transmitted to the server 130. As discussed above, the search completion options can be determined, generated, or retrieved based on applying the search request or search inputs from the electronic device into a predictive search query algorithm, such as the ones described above.

The search service 160 can include a search result database 165 from which search results associated with the search completion options generated by the server 130 (for example, by the search application module 140) or by the search completion service 150 can be selected, retrieved, and transmitted to the server 130.

The image service 170 can include an image database 175 from which images associated with the search results generated by the server 130 (for example, by the search application module 140) or by the search service 160 can be selected, retrieved, and transmitted to the server 130.

FIGS. 2-7 illustrate example embodiments of generating and displaying search completion results on a chalkboard interface of the present disclosure.

Figure 2:
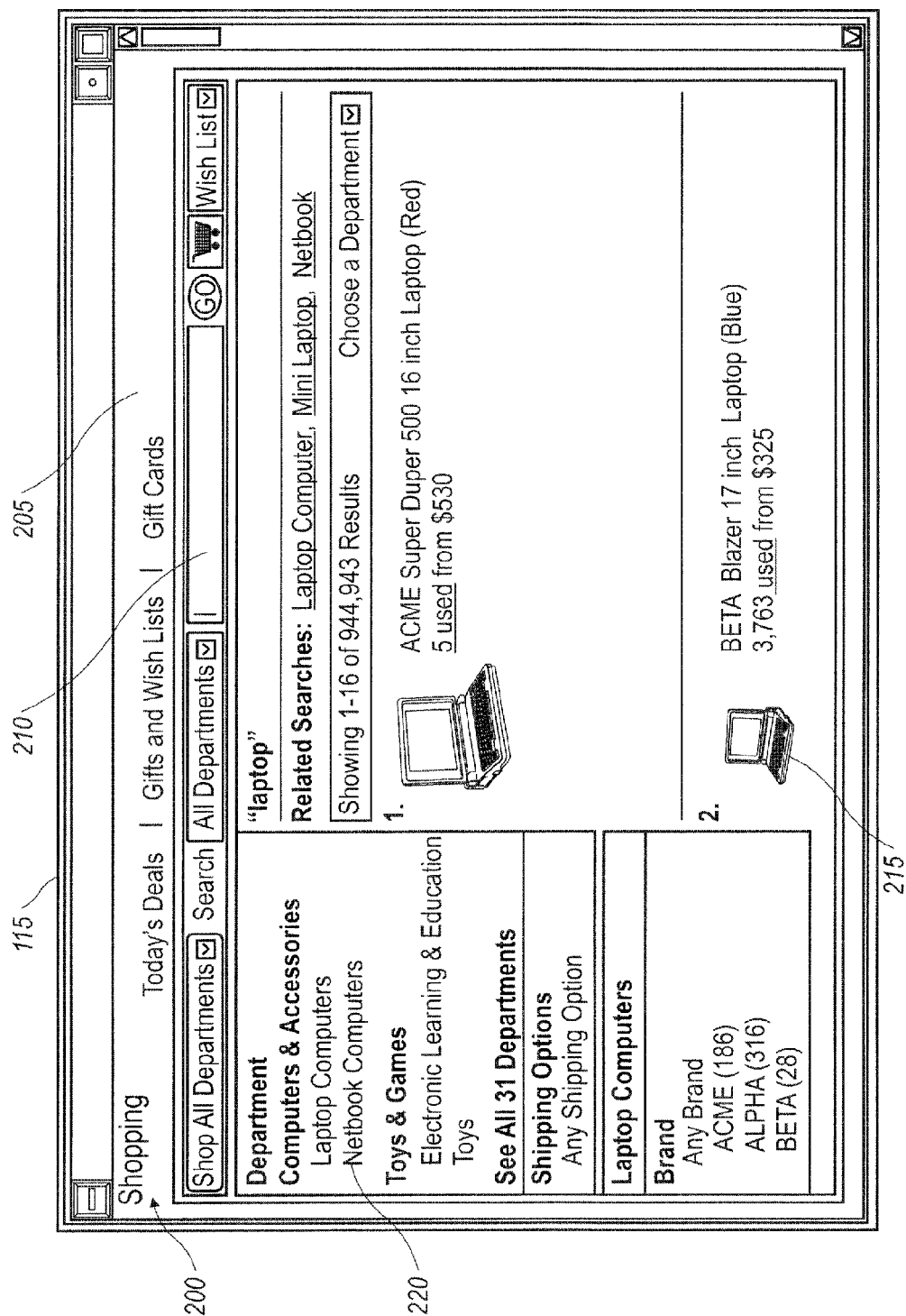
FIG. 2 is an illustration of a web browser application displaying a webpage having a search field in accordance with an example embodiment of the present technology.

FIG. 2 illustrates a GUI 200 of a web browser application displayed on a display 115 of an electronic device 100. Although a Web browser example is used for purposes of explanation, it should be understood that various other types of interface in alternative environments can take advantage of aspects of the various embodiments. The web browser application GUI 200 can display a webpage 205. For example, the webpage 205 illustrated in FIG. 2 can be an e-commerce webpage named "Shopping." The e-commerce webpage 205 can include a plurality of content such as text 220, images 215, or any other graphical information associated with the e-commerce webpage 205. The e-commerce webpage 205 can also include a search field 210. The user can enter a search request or search inputs in the search field 210. For example, the search request or search inputs can include search terms, keystrokes, a portion of a search term or search request (for example, the first letter, the first two letters, the first five letters, the first word, the first character, the first four characters, or any other portion or a search term of search request). The search request or search inputs can also include the first keystroke inputted by the user at a user input interface (for example, a keyboard, a virtual keyboard, a voice-command interface, a motion-command interface, a gaze-tracking interface, a camera, or any other user input interface of the electronic device 100). The first keystroke can be associated with a first letter or character that the user inputs when the user begins typing or inputting a search request or input in the search field 210. In FIG. 2, the user can input a search request, search query, or search inputs associated with a search for a product that the user desires to purchase. While FIG. 2 illustrates a webpage 205 that is an e-commerce webpage, the webpage 205 can also be a search engine webpage, a recipe webpage, a library webpage, a reference webpage (for example a web-based encyclopedia), or any other webpage which can include a search field 210.

Figure 3:
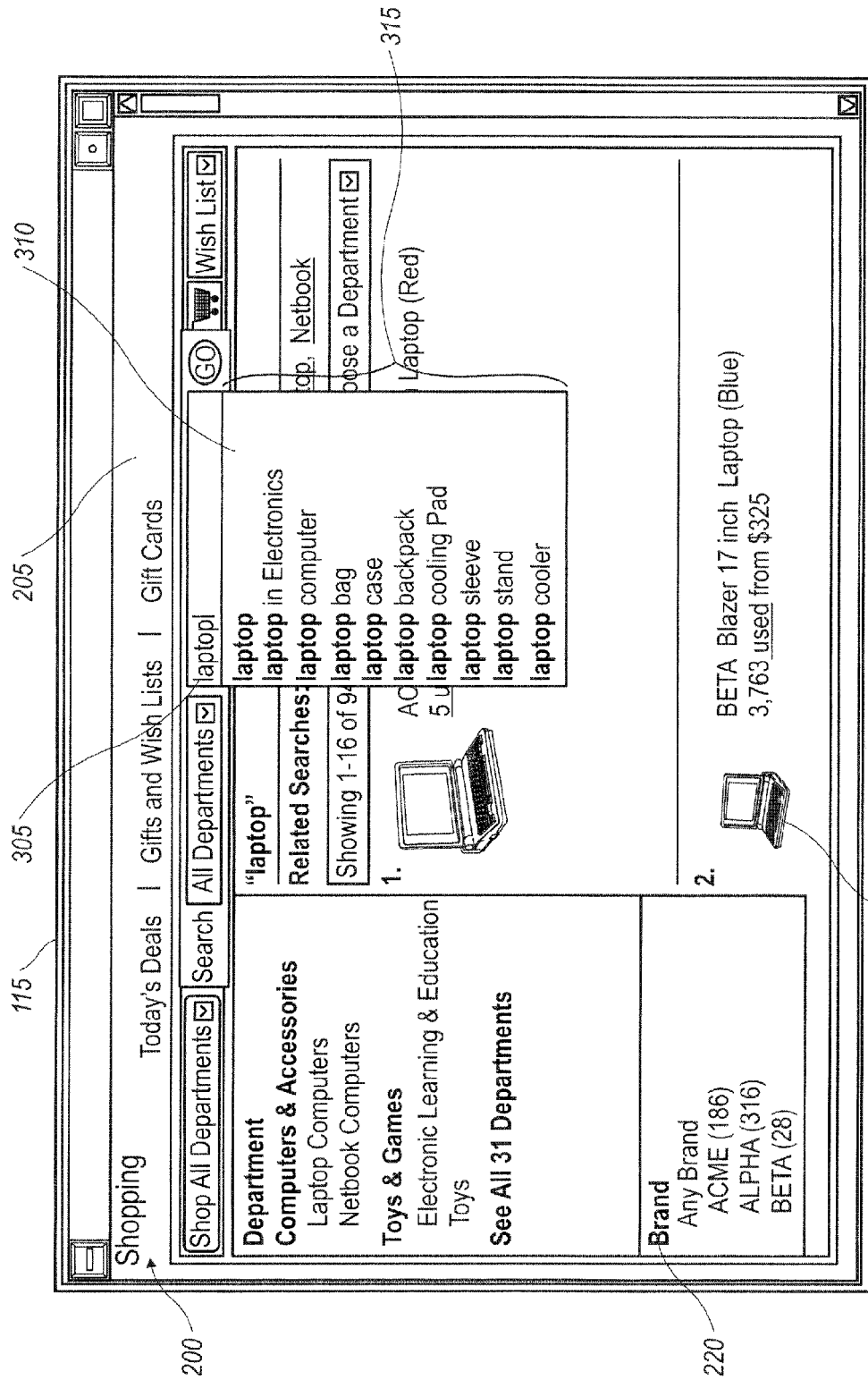
FIG. 3 is an illustration of the webpage illustrated in FIG. 2 in which a search input is entered into the search field in accordance with an example embodiment of the present technology.

FIG. 3 illustrates the entry of a search request or search input into the search field 210 of the webpage 205. As illustrated in FIG. 3, the search input is a first input 305 corresponding to a first search term of the user's desired or intended search query. For example, in FIG. 3, the first input 305 can correspond to the first six keystrokes the user inputs when beginning to input the user's search query into the search field 210. As the user types or inputs search inputs into the search field 210, the electronic device 100 can transmit data corresponding to the search inputs to server 130 in order to receive search completion options 315 to suggest to the user as the user continues typing or inputting input to the search field 210.

For example, in FIG. 3, the user has begun typing or inputting inputs into the search field 210. The inputs can be a first input 305 corresponding to the term "laptop." Data or a signal corresponding to the term "laptop" (e.g., the first input 305) can be transmitted to the server 130 (shown in FIG. 1). The server 130 can then transmit the first input 305 to a search completion service 150. The search completion service 150 can retrieve or generate search completion options based on the first input 305. The server 130 can receive the generated search completion options. The server can display the search completion options in a search suggest drop-down list 310 as illustrated in FIG. 3. The search completion options 315 can be suggested or predicted search queries suggested or predicted based at least in part on the first input 305 (e.g., the "laptop"). As illustrated in FIG. 3, the search suggest drop-down list 310 can include a plurality of search completion options 315 associated with the term "laptop" (e.g., the first input 305). Specifically, in FIG. 3, there can be ten search completion options 315. For example, the search completion options 315 can include: "laptop," "laptop in Electronics," "laptop computer," "laptop bag," "laptop case," "laptop backpack," "laptop cooling pad," "laptop sleeve," "laptop stand," and "laptop cooler." While FIG. 3 illustrates ten search completion options, those of ordinary skill in the art will appreciate that fewer or more search completion options can be displayed. Also, the number of search completion options displayed can be dependent upon the size of the display 115 of the electronic device 100, the size of the GUI 200 of the application, the available graphical real estate of the display 115, an aspect ratio of the display 115, a resolution of the GUI 200, or any other setting, characteristic or parameter of the display 115 or the GUI 200. As illustrated in FIG. 3, the search suggest drop-down list 310 can be displayed on top of or overlaid on graphical content 215, 220 of the webpage 205. The search suggest drop-down list 310 can also be displayed adjacent the search field 210.

FIG. 4 is an illustration similar to that of FIG. 3 in which a search input 305 is inputted into the search field 210 of the webpage 205. FIG. 4 differs from FIG. 3 in that, in addition to displaying a search suggest drop-down list 310 of search completion options, a chalkboard interface 400 can be displayed which displays at least some of the search results 420 of each of the search completion options 315. As illustrated in FIG. 4, the chalkboard interface 400 can be superimposed or overlaid over at least a portion of the GUI 200 of the web browser application. For example, the chalkboard interface 400 can be superimposed or overlaid over at least a portion of the webpage 205. Specifically, in FIG. 4, the chalkboard interface 400 can be superimposed or overlaid over the webpage 205 except for the portion corresponding to the search field 210. In other embodiments, the chalkboard interface 400 can be superimposed over a majority (for example 50% or more) of the display 115 of the electronic device except for the portion corresponding to the search field 210 or over an entirety of the display 115 except for the portion corresponding to the search field 210. As discussed above, the chalkboard interface 400 can be a DIV (for example, a black DIV) superimposed over the GUI 200 of the web browser application except for the portion corresponding to the search field 210. As the chalkboard interface 400 can be a DIV, where inputs, events, cursor events, or other interactions with the underlying interface (e.g., GUI 200) can be intercepted by the chalkboard interface 400 and directed to the chalkboard interface 400.

As illustrated in FIG. 4, the chalkboard interface 400 can be superimposed over the webpage 205 (for example, the underlying GUI). The chalkboard interface 400 can be semi-transparent such that the webpage 205 or the underlying GUI is at least partially visible. By making the chalkboard interface 400 semi-transparent, the information provided in the chalkboard interface 400 can be viewed without losing the context of the underlying webpage 205 the user was previously viewing and without losing the webpage 205 or information associated therewith when the chalkboard interface 400 is displayed.

The information provided in the chalkboard interface 400 can include the search suggest drop-down list 310 associated with the search input 305 "laptop" inputted into the search field 210. In FIG. 4, the search suggest drop-down list 310 can include the ten search completion options 315 as illustrated in FIG. 3. Similar to FIG. 3, the search suggest drop-down list 310 can be displayed adjacent the search field 210.

The chalkboard interface 400 can also include a search results section 405. As illustrated in FIG. 4, the search results section 405 can be displayed below the search field 210 and below the search suggest drop-down list 310; but in other embodiments, the search results section n405 can be displayed elsewhere on the chalkboard interface 400. The search results section 405 can include at least some of the search results 420 of at least some of the search completion options 315 generated based on the first search input 305 "laptop." For example, in FIG. 4, two search results 420 are provided for each of the ten search completion options 315. However, any other number of search results 420 can be provided for the search completion options 315. The search results 420 can be generated by the server 130 or by a search service 160 communicatively coupled to the server 130. For example, the server 130 can transmit the search completion options 315 to the search service 160 to generate search results 420 for each of the search completion options 315. The search results 420 can be transmitted from the search service 160 to the server 130. The server 130 (for example via the chalkboard module 145) can compile or organize the search results 420 based on the search completion options 315. That is, the search results 420 can be grouped by their corresponding search completion options 315 such that the chalkboard interface 400 displays one or more search completion options 315 along with their corresponding one or more search results 420. The search results 420 can be hyperlinks to webpages that are pertinent or associated with the search completion option 315, standard identification numbers of products that are pertinent or associated with the search completion option 315, barcodes of products that are pertinent or associated with the search completion option 315, electronic documents that are pertinent or associated with the search completion option 315, or any other search result associated with the search completion option 315.

In FIG. 4, the search results section 405 can include one or more columns 410. Each of the columns 410 can correspond to one of the search completion options 315. Each column 410 can include at least some (for example, one or more) of the search results 420 corresponding to the search completion options 315. For example, as illustrated in FIG. 4, the search results section 405 can include ten columns 410 corresponding to each of the ten search completion options 315 generated based on the first search input 305. As at least some of the search results 420 for each of the search completion options 315 can be displayed on the electronic device 400, the user can better determine which, if any, of the search completion options 315 will generate search results that are pertinent to the user's intended search query. Additionally, if the chalkboard interface 400 includes a search result that substantially matches the user's intended search query, the user can obtain the user's desired search result(s) quickly, efficiently, and in fewer keystrokes or fewer clicks. For example, the user can select the search result that substantially matches the user's intended search query directly from the chalkboard interface 400 without having to select and execute the corresponding search completion option and without having to wait for the search results of the corresponding search completion option to be displayed.

As illustrated in FIG. 4, the columns 410 corresponding to the search completion options 315 can include a label 415 corresponding to the search completion option 315. For example, the label 415 can include the terms of search completion option 315. For example, the search terms of the suggested or predicted search query associated with the search completion option 315. In at least one embodiment, the label 415 can be a selectable label, for example, a hyperlink. A selection of the label 415 can cause the chalkboard interface 400 to be minimized, moved, or removed such that the underlying GUI 200 is returned to the foreground of the display 115. The selection of the label 415 can also cause the search results 420 associated with the selected label 415 (and thus associated with the corresponding search completion option 315) to be displayed in the GUI 200 of the web browser application.

Also illustrated in FIG. 4, the search results 420 can be represented by an image 425 associated with the search result 420. For example, the image 425 can be retrieved by the server 130 from an image service 170. In FIG. 4, the image 425 can be an image of a product corresponding to the search result 420. In other embodiments, the image 425 can be an icon, a photo, a drawing, or any other graphical representation of the search result 420. The image 425 can be a thumbnail or any size image which can be displayed in the chalkboard interface 400.

Figure 5:
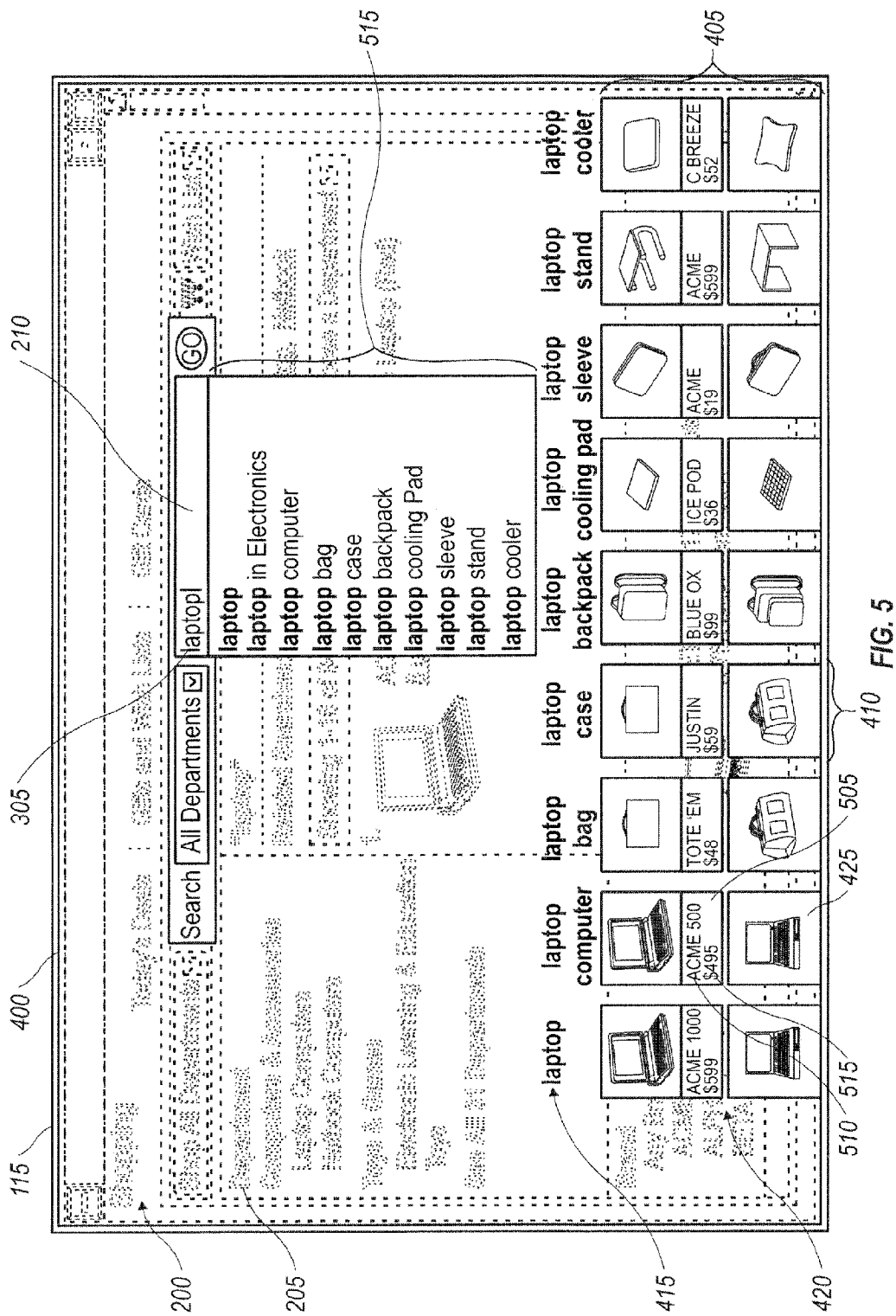
FIG. 5 is an illustration of a GUI having a plurality of search completion options having corresponding search results including detailed descriptions.

In other embodiments, the search results 420 can include the image 425 and a detailed description 505, as illustrated in FIG. 5. The detailed description 505 can provide additional information associated with the corresponding search result 420. For example, additional information which the user may find helpful in determining whether the search result 420 is pertinent to the user's desired search result or intended search query. Specifically, in FIG. 5, the detailed description 505 can include a product name 510 and a price 515 of the product. In other embodiments, the detailed description 505 can include a text description of the product, a summary of the search result 420, explanatory text associated with search results 420, a hyperlink address of the search result 420, an excerpt from the search result 420, a preview of the search results 420, a relevance score of the search result 420 with respect to the corresponding search completion option 415, a phone number, a vendor, or any other information associated with the search result 420.

In FIGS. 4 and 5, the search results 420 can be displayed in the chalkboard interface 400 using an animation. For example, the columns 415 of search results 420 can be displayed in a sweeping animation from a left side to a right side of the chalkboard interface 400; a sliding animation from a left side to a right side of the chalkboard interface 400; an accordion animation from a left side to a right side of the chalkboard interface 400; a pop-up animation from a bottom to a top from a left side to a right side of the chalkboard interface 400, where each column 415 is popped up beginning from a left side to a right side of the chalkboard interface 400; or any other animation.

Additionally, while FIGS. 4 and 5 illustrate a chalkboard interface 400 comprising ten columns 415 of search results 420 for each of the search completion options 310, those of ordinary skill in the art will appreciate that fewer or more column 415 can be included. For example, the number of columns 415 can be default-selected by the server 130, the web browser application 200, or any other application or setting of the electronic device 100 or server 130. In other embodiments, the number of columns 415 included in the chalkboard interface 400 can be set or selected by the user in a settings menu corresponding to the chalkboard interface 400. In still other embodiments, the number of columns 410 can be dynamically set or automatically set by the processor 105 of the electronic device 100 or the processor 135 of the server 130 based at least in part on a size of the display 115 of the electronic device 100, an aspect ratio of the display 115, a resolution of the display 115, a detected available real estate of the display 115, a size of the underlying interface 200 displayed on the electronic device 100, or any other parameter or setting associated with the available real estate of the display 115. Similarly, while FIGS. 4 and 5 illustrate two search results 420 for each of the columns 415 of the corresponding search completion, those of ordinary skill in the art will appreciate that the number of search results 420 displayed can be fewer or more than two. Similar to the number of columns 415, the number of search results 420 provided in the chalkboard interface 400 can be default-selected, user-selected, or dynamically or automatically selected based at least in part on parameters or settings associated with the available real estate for graphical information on the display 115.

Figure 6:
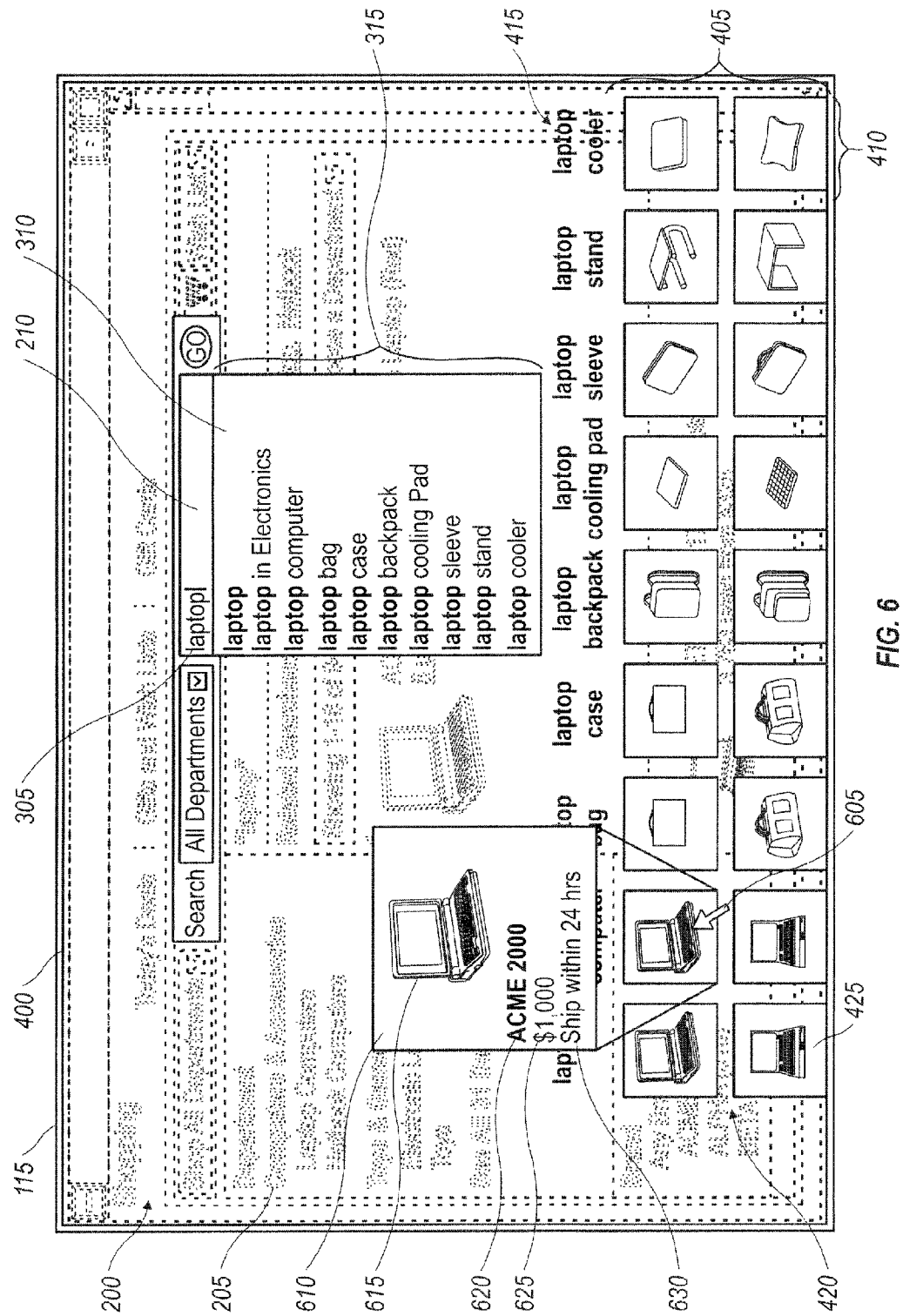
FIG. 6 is an illustration of a GUI displaying detailed information associated with a search result in response to a hover input over the search result.

In FIG. 6, a user can interact with the chalkboard interface 400. For example, in FIG. 6, the user can hover a cursor 605 over one of the search results 420 displayed in the chalkboard interface 400. The cursor 605 can be an arrow, a pointer, a cross-hair, or any other graphical item which can be user-controlled to hover of a search result 420. For example, hovering the cursor 605 over the search result 420 can be a hover input. The hover input can include placing or positioning the cursor over at least a portion of a search result 420 for at least a predetermined period. For example, the predetermined period can be: user-selected, user-defined, or default-selected by the server 130 (for example, by the chalkboard interface module 145) the electronic device 100 (for example, by the application module 110). The predetermined period can be five seconds, ten seconds, one second, one minute, or any other period which can indicate that the hover input is intentionally inputted by the user.

In response to the hover input, a detailed description window 610 can be displayed adjacent the corresponding search result 420 (e.g., the search result 420 on which the cursor 605 hovers). In FIG. 6, the detailed description window 610 can include an enlarged image 610 of the thumbnail image 425 associated with the search result 420. The detailed description window 610 can also include a name 615 of a product associated with the search result 420, a price 620, and shipping information 625. Those of ordinary skill in the art will appreciate that the detailed window 610 can include fewer or more information than as illustrated in FIG. 6 and can include other information associated with the search result 420 different from that illustrated in FIG. 6. For example, the detailed description window 610 can include a preview of the corresponding search results 420. In still another embodiment, the detailed description window 610 can include an option (for example, a "more like this" option) that allows the user to save the corresponding search result 420, the corresponding search completion option 415, the search results of the corresponding search completion option 415 or a combination thereof in a storage section (for example a cart section). The search results and search completion options in the storage section (not shown) can be identified as "favorite searches," "common searches," or "frequent searches." As the detailed description window 610 can be displayed in response to a hover input, the user can be provided with additional information regarding the displayed search result without clicking or inputting a keystroke. Thus, the user can quickly process, peruse, and analyze the search results 420 to determine whether the search results 420 are pertinent to the user's desired or intended search query and to obtain the user's desired search result with fewer keystrokes and clicks that conventional search engines and search features.

In at least one embodiment, in response to a hover input over a search result 420 or a selection of the search result 420, the detailed window 310 can be an enlarged or zoomed-in view of the image 425 corresponding to the search result. In other embodiments, the detailed window 310 can be animated to appear in the chalkboard interface 400. For example, the detailed window 310 can be swept in to the chalkboard interface 400 from a left side of the chalkboard interface 400, and the remaining search results 420 can be swept off the chalkboard interface 400 towards a right side of the chalkboard interface 400. While FIG. 6 illustrates the detailed window 610 as a pop-up, a bubble, or a magnification window positioned adjacent to the corresponding search results 425, the detailed window 610 can be positioned elsewhere on the chalkboard interface 400. For example, the detailed window 610 can be displayed in a dedicated section (such as a detailed view section) (not shown) of the chalkboard interface 400. For example, the detailed view section can be positioned beneath the search field 210 and above the columns 415 corresponding to the search completion options 315. The detailed view section can also replace the search suggest drop-down list 310 in response to a hover input over a search result 420.

In another embodiment, in response to the hover input over a search result 420 or a label 415 of the column 410, the search results corresponding to the search completion option 315 associated with the associated search result 420 (for example, the hovered search result) or the associated label 415 (for example, the hovered label) can be displayed on the chalkboard interface 400. For example, all the search results 420 or a larger subset of search results 420 than the currently displayed search results 420 of the search completion option 315 can be displayed in a pop-up window. In another example, all the search results or a larger subset of the search results 420 of the search completion option 315 associated with the hovered search results or hovered label can replace the currently displayed columns 415 of search results 420.

In still another embodiment, a hover input over a search result 420 (for example, a hovered search result) can cause a generation of another set of search completion options (for example, third search completion options) based on the search terms of the search completion option associated with the hovered search result. That is, the search terms of the search completion option associated with the hovered search result can be used (for example by the server 130 or the search completion service 150) to generate refined or modified search completion options. The server 130 or the search service 160 can generate additional search results (for example, third search results) associated with each of the third search completion options. The chalkboard interface 400 can then be modified to include the third search completion options and third search results. For example, the chalkboard interface 400 can be modified such that the previously-displayed search results (e.g., first search results) and previously-displayed search completion options (e.g., first search completion options) can be replaced with the third search completion options and third search results. The replacement of the first search results and first search completion options by the third search completion options and third search results can be animated. For example: the columns comprising the first search results and the first search completion options can fall towards a bottom of the display screen, and a new set of columns corresponding to the third search completion options and third search results can fall from the top of the display screen towards the previous position of the columns of the first search results and first search completion options; the columns comprising the first search results and the first search completion options can disappear from the display screen, and the new set of columns corresponding to the third search completion options and third search results can slide in or sweep into the chalkboard interface 400 from the left side to the right side of the chalkboard interface 400; or any other animation can be used animate the replacement of the first search results and first search completion options by the third search completion options and third search results.

Figure 7:
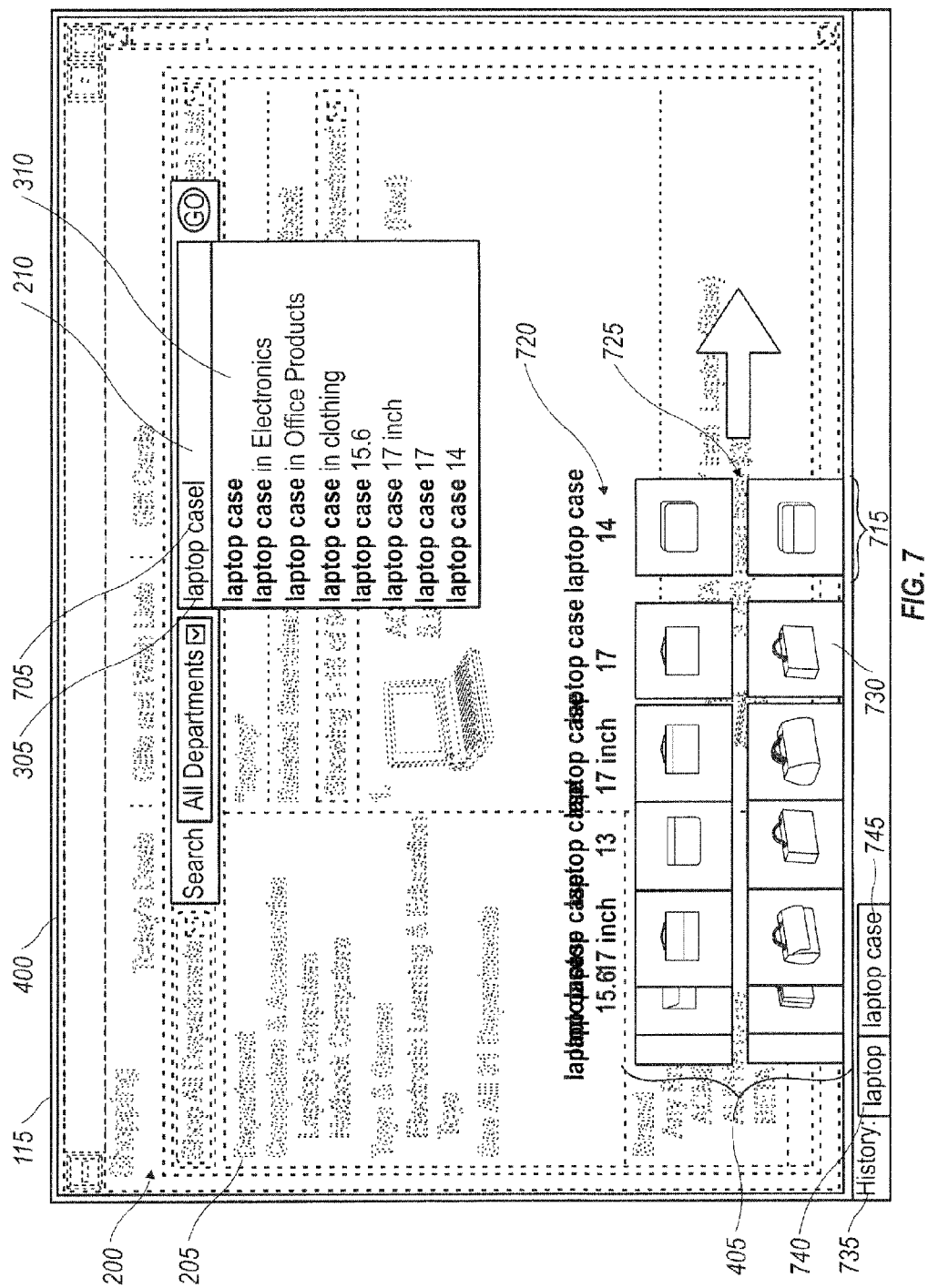
FIG. 7 is an illustration of a modification of the GUI illustrated in FIG. 4 in response to a second input entered in the search field in accordance with an example embodiment of the present technology.

In at least one embodiment, a second input (for example, a second search input) can be received in the search field 210 from the electronic device 100 while the chalkboard interface 400 is displayed on the electronic device 100, as illustrated in FIG. 7. For example, the second input 705 can be a second search term appended to or combined with the first search term 304. Specifically, in FIG. 7, the second input 705 is the second search term "case." In FIG. 7, the second search term 705 can be appended to or combined with the first search term 305 ("laptop") to result in a new search term "laptop case." Data or a signal corresponding to the second input 705 can be transmitted to the server 130. The server 130 or the search completion service 160 can generate modified search completion options (for example, second search completion options) based at least in part on the second input 705. The generated modified search completion options 710 can be used to update the chalkboard interface 400 to include the modified search completion options 710. For example, the search suggest dropdown list 310 can be modified to replace the previously-displayed search completion options 315 with the modified search completion options 710. Specifically, in FIG. 7, the modified search completion options 710 based at least upon the first input 305 and second input 705 ("laptop case") can include the search completion options 710: "laptop case," "laptop case in Electronics," "laptop case in Office Products," "laptop case in clothing," "laptop case 15.6" (associated with laptop cases for 15.6-inch display laptops), "laptop case 17 inch" (associated with laptop cases for 17-inch display laptops), "laptop case 17" (associated with laptop cases for 17-inch display laptops), and "laptop case 14" (associated with laptop cases for 14-inch display laptops).

While FIG. 7 illustrates a second input 705 that is a search term, in other embodiments, the second input 705 can be a second keystroke. For example, the first input 305 can be a first keystroke corresponding to the character "W," and the second input 705 can be a second keystroke corresponding to the character "a." The second input 705 can be appended to the first input 305 to result in the search characters or partial term "Wa." The server 130 or search completion service 150 can then return search completion options such as "Water," "Washington D.C.," "Washington Memorial," "Wasps," or other search completion options based on the first input and second input "Wa."

Based on the modified search completion options 710, the server 130 or the search service 160 can generate search results 730 (for example, second search results) for each of the modified search completion options 710. The server 130 (for example, via the chalkboard interface module 145) can modify the chalkboard interface 400 based at least in part on the second search results corresponding to the modified search completion options 710. For example, the search results section 405 of the chalkboard interface 400 can be modified such that the first search results 420 of chalkboard interface 400 are replaced with the second search results 730 corresponding to the modified search completion options 710. For example, the columns 310 corresponding to the first search completion options 315 can be replaced with new columns 715 corresponding to the modified or second search completion options 710. Each new column 715 can include the corresponding search results 725 (for example, second search results). The replacement of the first search completion options 415 and first search results 420 by the second search completion options 710 and second search results 725 can be animated as discussed above. For example, in FIG. 7, the columns 410 having the first search completion options 315 and the search results 420 can be removed from the chalkboard interface 400 by a disappearing animation. The new columns 715 can then be displayed in a sweeping animation or a sliding animation from a left side to a right side of the chalkboard interface 400, as illustrated by the arrow in FIG. 7. Similar to FIG. 4, each of the new columns illustrated in FIG. 7 can include a label 720 associated with the corresponding modified or second search completion option 705.

The modification of the chalkboard interface 400 to include the new columns 715 corresponding to the modified or second search completion options 710 and modified or second search results 725 can be displayed in the chalkboard interface 400 in response to the server 130 transmitting instructions to the electronic device 100 to be executed by the processor 105 of the electronic device 100. For example, the instructions, when executed by the processor 105 can cause the processor 105 to update or modify the chalkboard interface 400 with at least one of the new columns 715, the modified or second search completion options 710, and the modified or second search results 725. In other embodiments, the modification of the chalkboard interface 400 can be displayed in response to receiving a modified chalkboard interface generated by the server 130 and transmitted by the server 130 to the electronic device 100 for display on the electronic device 100.

Also illustrated in FIG. 7, the chalkboard interface 400 can include a history section 735. The history section 735 can be a history map mapping the search inputs entered by the user and the corresponding search completion options and results generated in response to the search inputs. In another embodiment, the history section 735 can include a timeline mapping the search inputs entered by the user. The user can select a mapped search input to return to any previous search completion option or result or even the chalkboard interface itself (for example, the state of the chalkboard interface) that was generated for the selected mapped search input.

The history section 735 can store previous search completion options, searches, search results, search refinements, and selected search results associated with the chalkboard interface 400. In other embodiments, the history section 735 can also include previous chalkboard interfaces, chalkboard interfaces generated on other devices associated with the user (for example, chalkboard interfaces generated on another device logged onto by the user), chalkboard interfaces stored on a cloud database belonging to the user, previous states of the chalkboard interface from a time prior to the presently generated chalkboard interface 400, or any other chalkboard interface. The history section 735 can include icons, tabs, miniature chalkboard interfaces, chalkboard interface that are reduced in size, or any other visual identifier representing previous searches, previous search completion options, previous search results, previous search refinements, previous selected search results, previously-generated chalkboard interfaces, and other associated chalkboard interfaces. By providing a history of previous searches, previous search completion options, previous search results, previous search refinements, previous selected search results, previous chalkboard interfaces generated, and other associated chalkboard interfaces, the user can recall previous searches so that the user does not have to re-run the same search. This can thereby increase the user's efficiency in obtaining search results associated with the user's desired or intended search and can reduce processing time and processing power as fewer clicks, keystrokes, and search engine executions are reduced.

The user can restore a previous state of a search or return to a previous search completion. For example, in FIG. 7, the search history 735 includes a first tab 740 corresponding to the chalkboard interface 400 generated for the search term "laptop" and a second tab 745 corresponding to the chalkboard interface 400 generated for the search term "laptop computer." If the user desires to recall or return to the chalkboard interface 400 generated for the search term "laptop," the user can select the first tab 740, and the corresponding chalkboard interface 400 can be rendered and displayed on the display 115 of the electronic device 100. The history section 735 can also allow the user to synchronize chalkboard interfaces generated on a plurality of electronic devices belonging to the user or on which the user was logged-in.

In another embodiment, the history section 735 can include states of previously-generated chalkboard interfaces corresponding to webpages or underlying interfaces. A selection of such previously-generated interfaces can display the last-saved chalkboard interface generated when the user last visited the webpage or last accessed the underlying interface. In another embodiment, with such states of previously-generated chalkboard interfaces, when the user returns to a webpage or returns to the underlying interface at a later time, the last-saved chalkboard interface previously generated and superimposed on the webpage or the underlying interface can be regenerated or display on the display 115 of the electronic device 100.

In still another embodiment, the history section 735 can allow the user to select any of the saved or stored chalkboard interfaces stored therein to build a new search query. For example, the user can select two saved or stored chalkboard interfaces, and a new chalkboard interface can be generated based on the search terms and search completion options of the selected saved or stored chalkboard interfaces.

While not illustrated in FIGS. 3-7, a user can mark-up or add notes to the chalkboard interface 400. For example, the user can circle, place check marks, place a virtual sticky tab, highlight, or otherwise mark the search results, search completion options, or a combination thereof. The user can also add virtual post-it notes or messages on the chalkboard interface 400. Also, the user can mark or identify one or more search results 420, 725, one or more search completion options 310, 710, or any combination thereof, as a target search result or search completion option indicating that the such search results and/or search completion options are pertinent to or highly similar the results the user expects from the user's intended search query. The marked search completion options and/or search completion options can then be used to refine the search results or search completion options in another chalkboard interface or in the same chalkboard interface. In another embodiment, the search results and/or search completion options can be dragged into a "target bin," a container, or a folder, or otherwise dragged into a delectated section of the chalkboard interface 400 (for example, a target search section) to allow the user to store the search results and/or search completion options that the user determines as being highly pertinent or relevant to the user's intended or desired search query.

Also, while not illustrated in FIGS. 2-7, the chalkboard interface 400 can include a view option. For example, the view option can allow the user to determine how much of the chalkboard interface 400 is visible on the display 115 of the electronic device 100. The view option can allow the user to select a size of the chalkboard interface 400 to be displayed on the display 115 of the electronic device 100. The view option can also include a toggle switch that can allow the user to toggle a view between the underlying interface 205 and the chalkboard interface 400. The view option can also allow the user to recall the chalkboard interface 400 to be superimposed over an underlying interface 205 even if a search input has not yet been received in the search field 210.

Those of ordinary skill in the art will appreciate that in at least one embodiment in which detailed information 505 is provided with the image 425 associated with the search result 420 as illustrated in FIG. 5 and in which modified search results 725 can be provided in response to subsequent or second search inputs, the chalkboard interface 400 can display search results 420 with detailed information 505 if a second search input has not been received within a predetermined time period. For example, prior to one or any second search input, detailed information can be displayed with the search results 420. In one specific example, if a predetermined time period for entering a second search input has expired and a second search input has not been received, the chalkboard interface 400 can display search results 420 with detailed information 505. If however, a second search input has been received within the predetermined period, the chalkboard interface 400 will not display search results 420 with detailed information 505. Instead, the modified search completion option 710 and corresponding search results 725 will be displayed. Such delay in providing detailed information 505 with the images 425 of the search results 420 allows for quick determinations of search completion options and quick displays of search results 420 based on user inputs. This can thereby reduce excess processing power, processing time, and battery consumption to arrive at the search results that are most pertinent to the user's desired search query.

Those of ordinary skill in the art will appreciate that the generation of and modification of the search completion options 315, 710 can be done substantially instantaneously or substantially simultaneously as the user types or inputs the characters of the user's intended search query. For example, the search completion options 315, 710 and corresponding search results 420, 725 can be updated substantially simultaneously or substantially concurrently with or in response to each received keystroke, input, or typing input inputted by the user in the search field 150. Thus, the chalkboard interface 400 is a dynamic interface that can be updated and modified to display the search completion options and corresponding search results each time the user enters a keystroke, input, or typing input in the search field 150 of an underlying interface 200 (for example, a webpage 205) displayed on the electronic device 100.

Those of ordinary skill in the art will appreciate that the features described and illustrated in FIGS. 2-7 can be optionally included or combined with one other to accomplish the technical advantages of the present disclosure.

Figure 8:
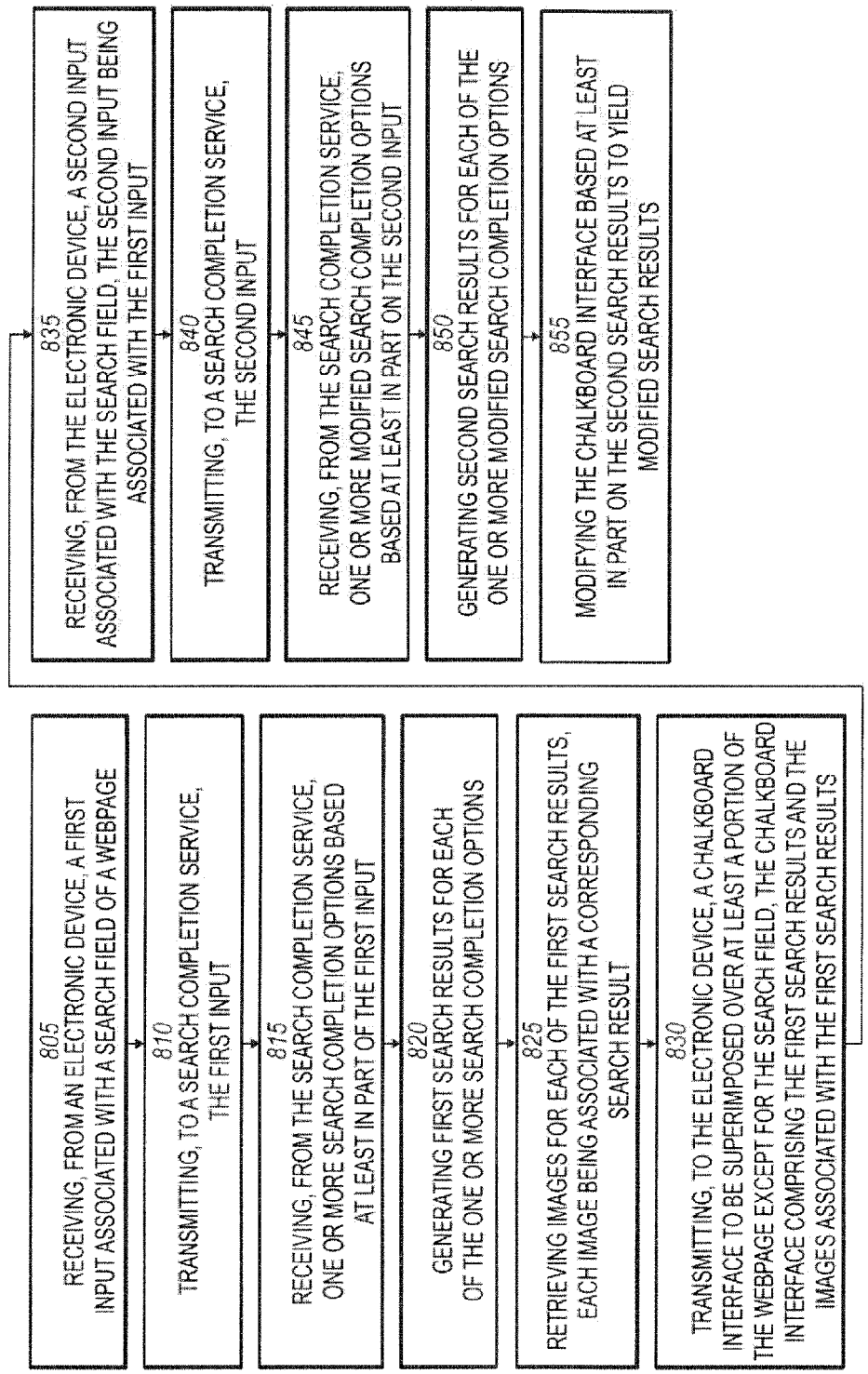
FIG. 8 is flow chart of a method of displaying search completion results in accordance with an example embodiment of the present technology.
Figure 9:
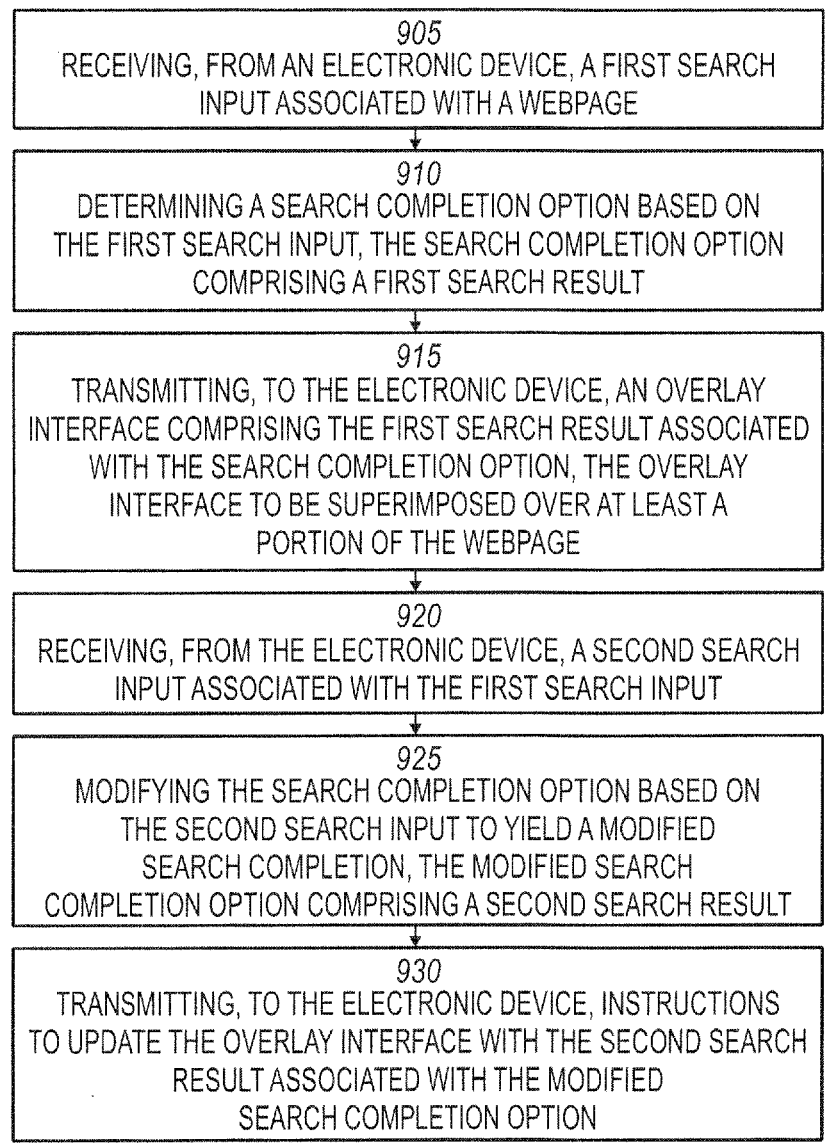
FIG. 9 is a flow chart of another example method of displaying search completion results.
Figure 10:
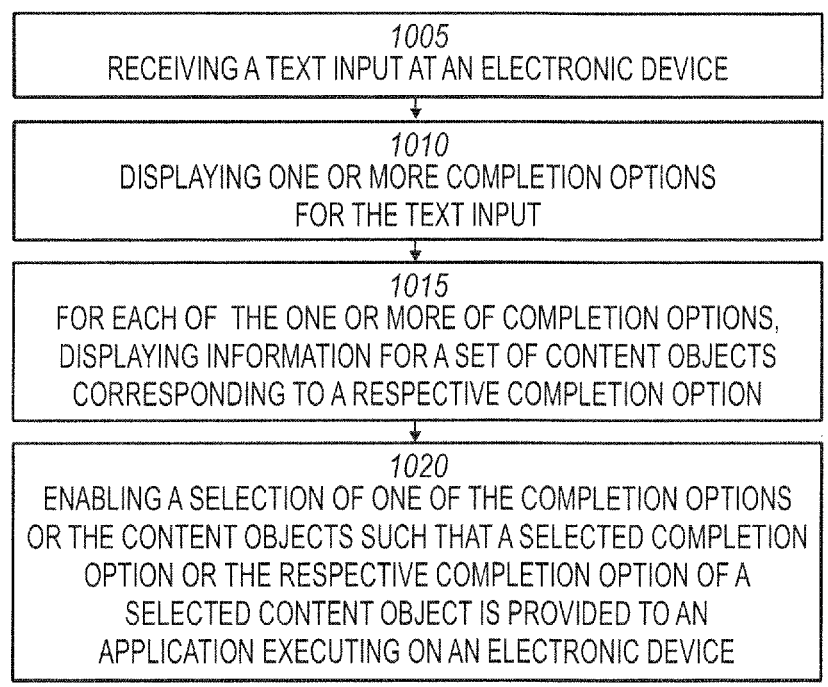
FIG. 10 is a flow chart of another example method of displaying search completion results from a client-side perspective in accordance with an example embodiment.

FIGS. 8-10 are flow charts of example embodiments of methods displaying search completion options. The methods 800, 900, 1000 illustrated in FIGS. 8-10 are provided by way of example, as there are a variety of ways to carry out the methods. Additionally, while the example methods 800, 900, 1000 are illustrated with a particular order of steps, those of ordinary skill in the art will appreciate that FIGS. 8-10 and the steps illustrated therein can be executed in parallel (e.g., at the same time) or in any order that accomplishes the technical advantages of the present disclosure and can include fewer or more steps than illustrated.

Each block shown in FIGS. 8-10 represents one or more processes, methods or subroutines, carried out in one example method 800, 900, 1000. The steps illustrated in FIGS. 8-10 can be implemented in a system including a mobile electronic device, such as a smartphone, a tablet computer, or any other electronic device configured to capture images. In at least one example, the methods illustrated in FIGS. 8-10 can be implemented in scripting language associated with or embedded in a webpage. The flow charts illustrated in FIGS. 8-9 will be described in relation to and make reference to an electronic device 100 and a server 130 illustrated in FIG. 1 and the chalkboard interface 400 illustrated in FIGS. 3-7.

FIG. 8 is a flow chart of one example of a method of displaying search completion results. In FIG. 8, the method 800 can begin at block 805. At block 805, a first input associated with a search field of a webpage displayed on an electronic device 100 can be received. For example, a server 130 communicatively coupled to the electronic device 100 can receive the first input associated with the search fields 210 of a webpage 205. The first input 305 can correspond to a first search input such as a first search term, a first keystroke inputted by a user and indicating a first letter of a user's intended search query, a first set of keystrokes, a first set of characters of a search term or search query, or any other first search input as described above. After a first search input is received, the method can proceed to block 810.

At block 810, the first input 305 can be transmitted to a search completion service 150. For example, the server 130 can transmit the first input 305 to the search completion service 150. The search completion service 150 can determine, generate, and/or retrieve search completion options, such as predicted search completion options or suggested search completion options, based at least in part on the first input 305 received. The search completion service 150 can determine or generate search completion options or determine which search completion options to retrieve from a search completion database 155 using a predictive algorithm as discussed above. After transmitting the first input 305 to the search completion service 150, the method can proceed to block 815.

At block 815, one or more search completion options (for example, a set of search completion options) based at least in part on the first input 305 can be received from the search completion service 150. For example, the server 130 can receive the one or more search completion options 315. The search completion options 315 can correspond to search queries capable of being entered into a search interface element, such as a search field of a webpage. As discussed above and in relation to FIGS. 3-7, the search completion options 315 can be search queries that the search completion service 150 predicts as being the search query that the user of the electronic device is intending to type. After the search completion options 315 are received by the server, the method can proceed to block 820.

At block 820, first search results (for example, one or more search results or a set of search results) for each of the one or more search completion options 315 can be generated. For example, in FIG. 8, the server 130 can generate the first search results 420 (for example, the first set of search results) for each of the one or more search completion options 315. In another, embodiment, the server 130 can transmit the search completion options 315 to a search service 160, and the search service can return the first search results 420 for each of the one or more search completion options 315 to the server 130. The search results 420 can be retrieved from the search results database 165 of the search service 160. In FIG. 8, the search results can include hyperlinks, electronic documents, webpages, standard identifying numbers, International Standard Book Numbers (ISBN), news articles, or any other information associated with the corresponding search completion 315. After the search results 420 are generated, the method can proceed to block 825.

At block 825, in response to determining the first search results 420 associated with the one or more search compilations 315, images 425 for each of the first search results can be retrieved. The server 130 can retrieve the images 425 from a database associated with the server 130. In another embodiment, the server 130 can transmit the search results 420 to an image service 170. The image service 170 can determine which image or images 425 are associated with the search results 420. The image service 170 can then retrieve the determined image or images 425 from an image database 175 of the image service 170. The image service 170 can then transmit the image or images 425 to the server 130. As discussed above, the images 425 can be a thumbnail or an image that is representative of the search result (for example, an image of a subject discussed by the search result, an image of a product associated with the search result, a popular image associated with the search result, or any other image representing the search result). After retrieving the images 425 for each of the first search results 420, the method can proceed to block 830.

At block 830, a chalkboard interface 400 can be transmitted to the electronic device 100. For example, the server 130 can transmit the chalkboard interface 400. In FIG. 8, the server 130 can generate the chalkboard interface 400 (for example, via the chalkboard interface module 145). The server 130 can transmit the generated chalkboard interface 400 to the electronic device 100 for rendering on the display 115 thereof. In other embodiments, the server 130 can transmit data or information from which a processor 105 of the electronic device 100 can generate the chalkboard interface 100 and render on the display 115 thereof. As discussed above, the chalkboard interface 400 can be superimposed over at least a portion of the webpage 205 except for the search field 210. For example, the chalkboard interface 400 can be a semi-transparent DIV (for example, a black DIV) superimposed over at least a portion of the webpage 205 or over an entirety of the display 115 of the electronic device 100 except for the search field 210. As discussed above, the chalkboard interface 400 can include the first search results 420 and the images 425 associated with the first search results 420. Additionally, the chalkboard interface 400 can include a plurality of columns 410, where each column 410 corresponds to one of the search completion options 315 and includes the first search results 420 of the corresponding search completion 315. The first search results 420 can be represented by the images 425 associated therewith. After the chalkboard interface 400 is transmitted to the electronic device 100, the method can proceed to block 835.

At block 835, a second input associated with the search field 210 can be received from the electronic device. For example, the second input 705 can be received by the server 130. The second input 705 can be associated with the first input 305. For example, the second input 705 can be a second search input such as a second search term, a second keystroke inputted by a user and indicating a second letter of a user's intended search query, a second set of keystrokes, a second set of characters of a search term or search query, or any other second search input as described above.

While not illustrated in FIG. 8, at block 835, a determination can be made as to whether the second input 705 has been received within a predetermined period. If the second input 705 is not received within the predetermined period, the chalkboard interface 400 can be modified to include detailed information 505 for at least some of the first search results 420. For example, the first search results 420 can be transmitted by the server 130 to the search service 160 to retrieve the corresponding detailed information associated with the first search results 420.

If however, a second input 705 is received within the predetermined period, the method can proceed to block 840. Those of ordinary skill in the art will appreciate however that the determination as to whether the second input 705 has been received within a predetermined period can be optionally included.

At block 840, the second input 705 can be transmitted to the search completion service 150. For example, the server 130 can transmit the second input 705 to the search completion service 150. The search completion service 150 can determine, generate, and/or retrieve search completion options, such as predicted search completion options or suggested search completion options, based at least in part on the second input 705 to yield second search completion options 710. The search completion service 150 can also determine, generate, and/or retrieve search completion options, such as predicted search completion options or suggested search completion options, based at least in part on the second input 705 and the first input 305. The search completion service 150 can determine or generate the second search completion options 705 or determine which second search completion options 710 to retrieve using a predictive algorithm as discussed above. After transmitting the second input 710 to the search completion service 150, the method can proceed to block 845.

At block 845, one or more second or modified search completion options 710 based at least in part on the second input 705 can be received from the search completion service 150. For example, the server 130 can receive the one or more second or modified search completion options 710. As discussed above and in relation to FIGS. 3-7, the second or modified search completion options 710 can be search queries that the search completion service 150 predicts as being the search query that the user of the electronic device is intending to type. After the second or modified search completion options 710 are received by the server, the method can proceed to block 850.

At block 850, second search results 725 for each of the one or more second or modified search completion options 710 can be generated. For example, in FIG. 8, the server 130 can generate the second search results 725 for each of the one or more second or modified search completion options 710. In another, embodiment, the server 130 can transmit the second or modified search completion options 710 to a search service 160, and the search service 160 can return the second search results 420 for each of the one or more second or modified search completion options 710 to the server 130. In FIG. 8, the second search results 725 can include hyperlinks, electronic documents, webpages, standard identifying numbers, International Standard Book Numbers (ISBN), news articles, or any other information associated with the corresponding search completion option 710. After the second search results 725 are generated, the method can proceed to block 855.

At block 855, the chalkboard interface 400 can be modified based at least in part on the second search results 725 to yield modified search results. For example, the server 130 can modify the chalkboard interface 400 based at least in part on the second search results 725. In FIG. 8, the server 130 can modify the chalkboard interface 400 (for example, via the chalkboard interface module 145). The server 130 can transmit the modified chalkboard interface 400 to be rendered on a display 115 of the electronic device 100. In other embodiments, the server 130 can transmit data or information from which a processor 105 of the electronic device 100 can update the chalkboard interface 100 with the modified search results, for example, as illustrated in FIG. 7. The chalkboard interface 400 can continue to be modified in response to; subsequent inputs received in the search field 210, hover inputs as discussed above, or user interactions or selections of search completion options or search results displayed in the chalkboard interface. Modifications of the chalkboard interface 400 can stop or cease when no further subsequent inputs or interactions with the chalkboard interface 400 or search field 120 are received.

FIG. 9 illustrates another example of a method of displaying search completion results. The method 900 of FIG. 9 is similar to the method 800 illustrated in FIG. 8 except that the search completion options and search results of FIG. 9 are generated and determined without the use of a search completion service 150 or a search service 160. That is, the search completion options and search results of FIG. 9 are generated and determined by the server 130. For example, by the search application module 140 of the server 130. The method 900 illustrated in FIG. 9 can begin a block 905.

At block 905, a first search input associated with a webpage can be received from an electronic device. The receipt of the first search can be similar to that described in relation to block 805 of FIG. 8. After receiving the search input, the method can proceed to block 910.

At block 910, a search completion option can be determined. For example, the server 130 can determine the search completion option 315 based on the first search input 305. For example, via the search application module 145. In at least one embodiment, the search application module 145 can include predictive algorithms from which the server 130 can determine or predict search completion options 315 based on received inputs at the search field 120. The search completion option 315 can include a first search result 420. The first search result 420 can be retrieved from a database 165 communicatively coupled to the server 130. In another embodiment, the first search result 420 can be integrated with the search completion option 315. For example, a search for search results using the search completion option 315 query can be previously performed and stored in the database of the server 130. The server 130 then can recall the search completion option 315 and the corresponding search result 420. After the search completion option 315 is determined, the method can proceed to block 915.

At block 915, an overlay interface (for example, a chalkboard interface 400) can be transmitted to the electronic device 100. For example, similar to block 830 of FIG. 8, the overlay interface can be generated by the server 130, for example, by the chalkboard interface module 145 of the server 130. The server 130 can transmit the overlay interface 400 to the electronic device 100 so that a processor 105 of the electronic device can render the overlay interface 400 and superimpose the overlay interface 400 over at least a portion of the webpage 205. In another embodiment, the server 130 can transmit data to the electronic device 100 from which the processor 105 of the electronic device 100 can generate the overlay interface 400 and then display the overlay interface 400 on the display 115 of the electronic device 100. The overlay interface 400 can include the first search result 420 associated with the search completion option 315. After the overlay interface is transmitted to the electronic device, the method can proceed to block 920.

At block 920, a second search input 705 associated with the first search input 305 can be received from the electronic device 100. For example, the second search input 705 can be received similarly as in block 835 of FIG. 8. After the second search input is received 705, the method can proceed to block 925.

At block 925, the search completion option 315 can be modified based on the second search input 705 to yield a modified search completion option 710. For example, the server 130 can determine the modified search completion option 710 based on at least one of the first search input 305 and the second search input 705. For example, via the search application module 145. As described above, the search application module 145 can include predictive algorithms from which the server 130 can determine or predict search completion options based on received inputs. The modified search completion option 710 can include a second search result 725. The second search result 725 can be retrieved from a database 165 communicatively coupled to the server 130. In another embodiment, the second search result 725 can be integrated with the modified search completion option 710. For example, a search for search results using the modified search completion query option 710 can be previously performed and stored in the database of the server 130. The server 130 then can recall the modified search completion option 710 and the corresponding second search results 725. After the search completion option 315 is modified with the modified search completion option 710, the method can proceed to block 930.

At block 930, instructions to update the overlay interface 400 with the second search result 725 associated with the modified search completion option 710 can be transmitted to the electronic device 100. For example, the server 130 can transmit the instructions to the electronic device 100. The processor 105 of the electronic device 100 can execute the instructions and modify the overlay interface accordingly to include the second search result 725 associated with the modified search completion option 710, as well as the modified search completion option 710 itself.

While the above disclosure discusses an example method of displaying search completion results (for example, the determination of the search completion options and the generation of the chalkboard interface, etc.) occurring at the server, those of ordinary skill in the art will appreciate that the method of displaying search completion results can be performed at the client device (for example, the electronic device of the user). For example, those of ordinary skill in the art will appreciate that the methods described in relation to FIGS. 2-9 can be implemented and executed at the client device, for example, by the processor 105 of the electronic device 105. In one particular non-limiting example, FIG. 10 illustrates such a method of displaying search completion results performed at the client device (for example, the electronic device 100). In FIG. 10, the method 1000 can begin at block 1005.

At block 1005, a text input can be received at an electronic device 100. For example, a text input can be received at a search interface element 210 displayed on a display 115 of the electronic device 100. The search interface element 210 can be a search field of a webpage as illustrated in FIGS. 3-7. However, in other examples, the search interface element 210 can be a text entry field of a word processor, a directory finder, a "search programs" or "search files" field, a "create a new folder" field, or any other element by which text inputs can be received and which can be displayable on the display screen 115 of an electronic device 100. After receiving a text input, the method can proceed to block 1010.

At block 1010, a set of completion options 315 corresponding to the text input can be displayed. For example, the processor 105 of the electronic device 100 can determine search completion options 315 based on the text input received at block 1005. In other embodiments one or more processors or processing systems communicatively coupled to the electronic device 100 can determine and display the search completion options 315. In still another embodiment, the processor 105 of the electronic device 100 can transmit the text input to a search completion service 150 to retrieve the set of completion options 315 to display at the electronic device 100. Those of ordinary skill in the art will appreciate that a set of completion options 315 can include as few as one completion option 315 or can include one or more completion options 315. The set of completion objects 315 can be displayed in a semi-transparent or partially-transparent chalkboard interface 400 displayed over a page of content displayed at the electronic device 100, as illustrated in FIGS. 3-7. However, those of ordinary skill in the art will appreciate that the set of completion objects 315 or the chalkboard interface 400 does not necessarily need to be semi or partially transparent nor be an overlay superimposed over other content displayed at the electronic device 100. For example, set of completion object 315 can be displayed in a graphical user interface GUI (for example, a new window, a pop-up window, a new page of content that replaces any previously displayed pages of content, etc.) that is different from a current GUI, current window, or current page of content displayed at the electronic device 100. After displaying the set of completion options 315, the method can proceed to block 1015.

At block 1015, for each of the one or more completion options 315, information for a set of content objects 420 corresponding to a respective completion option 315 can be displayed. For example, the processor 105 of the electronic device 100 can determine or retrieve the content objects 420 for each of the completion options 315. In other embodiments one or more processors or processing systems communicatively coupled to the electronic device 100 can determine and display the content objects 420. In still another embodiment, the processor 105 of the electronic device 100 can transmit the text input to a search service 160 to retrieve content objects 420 for each completion option 315 of the set of completion options 315. The content objects 420 can be the search results corresponding to the respective completion option 315. That is, the content objects 420 can be the search results obtained by executing a search using the terms of the respective completion option 315. For example, the content objects 420 can be web pages for a URL entry, files for a filename entry, folders for a filename entry, contact names for a contact name search, or any other content object 420 associated or corresponding to the search completion 315. The information displayed for a set of content objects 420 can include images 425 representing a corresponding content object 420, a text description representing a corresponding content object 420, a text summary representing a corresponding content object 420, a file name of a corresponding content object 420, metadata of a corresponding content object 420, explanatory text associated with one or more of the content objects 420, or any other graphical representation of the one or more of the content objects 420 of the respective set of content objection 420. The set of content objects 420 can be displayed with the set of completions 315. For example, as illustrated in FIGS. 4-7 and discussed above, the content objects 420 can be displayed in columns 410, where each column 410 corresponds to a respective completion option 315 and where each column 410 includes the content objects 420 associated with or corresponding to the respective completion option 315 of that column 410. Each column 410 can also include an indication 415 (for example, text, a hyperlink etc.) identifying the corresponding search completion 315 of that column 410. After displaying the set of content objects 420 for each of the completions sets 315, the method can proceed to block 1020.

At block 102, at least one of the completion options 315 or the content objects 420 can be enabled for selection such that a selected completion option 315 or the respective completion option 415 of a selected content object 420 can be provided or input to an application executing on an electronic device 100. For example, the processor 105 of the electronic device 100 can enable such selection. In other embodiments one or more processors or processing systems communicatively coupled to the electronic device 100 can enable such selection. In at least one example, the user can select a completion option 315, for example, by selecting the indication 415 that is a hyperlink or selectable text associated with the desired completion option 315. Upon selecting the indication 415, the text associated with the desired completion option 315 can be provided or input to a search engine application or a search browser application. A search can be executed by the search engine application or search browser application using the text associated with the desired completion option 315. The search results (for example, all the search results or more search results than those corresponding to the displayed content objects 420) can be displayed or retrieved. In another example, the user can select one of the content objects 420, for example by clicking or selecting an image 425 representing the content object 420. The image 425 can be associated with a hyperlink. Upon selecting the image 420 representing the content object 420, the hyperlink can be inputted into a web browser application, and the webpage or web-based document associated with the hyperlink can be retrieved and displayed on the electronic device 100. In another embodiment, upon selecting the image 425, the text associated with the respective completion option 415 associated with the content object 420 of the image 420 can be inputted into a search engine application, and the search results for that respective completion option 415 can be displayed on the electronic device 100. Thus, in FIG. 10, the method of displaying search completion results provides for a dynamic interface in which each of or one or more search completion options and their corresponding search results are displayed to the user to allow the user to quickly and efficiently obtain the user's desired search result(s) or the most relevant or pertinent search result(s) associated with the user's desired search query or inputted text input.

While the above disclosure has described displaying the completion options 315 and their corresponding search results and/or content objects 420 in partially-transparent interface superimposed over underlying content 200 displayed on the display screen 115 of an electronic device, those of ordinary skill in the art will appreciate that the completion options 315 and their corresponding search results and/or content objects 420 can be displayed in a separate GUI, a new page of content that replaces the underlying content 200, a pop-up GUI, a frame adjacent to the page of underlying content 200 displayed on the electronic device 100, or elsewhere on the display 115 of the electronic device 100.

Those of ordinary skill in the art will also appreciate that the systems and methods of displaying search completion options 315 and their corresponding content objects 420 is not limited to the Web browser implementation discussed and illustrated in FIGS. 3-7. The systems and methods of displaying search completion options 315 and their corresponding content objects 420 can be implemented in a file search application, a search for contact information (for example, an electronic address book), an e-commerce application, a file naming application, a word processing application, a photo editing application, or any other application in which a text input can be received and an autocomplete or suggested completions corresponding to the text input can be displayed and presented.

Based on the above disclosure, the present systems, methods, and computer program products for displaying search completion results provides for a user-intuitive and efficient search feature. As the user is presented with suggested or predicted search completion options and their corresponding search results that dynamically change with each typed or inputted character of the users' intended search query, users can quickly search and retrieve search results that are more pertinent to the users' intended search query. Furthermore, as users are presented with the corresponding search results of the suggested or predicted search completion options without the user's active selection of the suggested or predicted search completion options, fewer clicks and keystrokes are required by the user to determine which search completion options are relevant to the users' intended search query. Additionally, fewer clicks and keystrokes are required to provide information which the user can utilize to narrow or refine their subsequent keystrokes for the users' intended search query, as the chalkboard interface 400 simultaneously displays each of the search completion options and their corresponding search results. For example, based on the suggested or predicted search completion options and their corresponding search results, users can refine their intended search query mid-keystroke or as they type by comparing the search terms of the search completion options and the corresponding search results to the search result the user is attempting to obtain.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device.

Embodiments of the present disclosure may be provided as a computer program product including a nontransitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be Internet download.

Based on the disclosure and teachings provided herein, a person of ordinary skill in the art will appreciate other ways and/or methods to implement the various embodiments. The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of completing a search query, comprising:
under control of one or more computer systems confirmed with executable instructions,
receiving a text input, associated with a product available for purchase, to a search interface element displayed on an electronic device, the search interface element associated with a page of content of an electronic marketplace, the page of content having a graphical appearance;

transmitting the text input to a search completion service;

receiving, from the search completion service, a set of search completion options corresponding to the text input, each search completion option corresponding to a search query capable of being entered into the search interface element starting with the text input;

obtaining a set of product search results for each search completion option of the set of search completion options;

displaying, as a first overlay above the page of content, a product image for each of at least a subset of the set of product search results corresponding to a respective search completion option, each product image including product purchasing information and an indication of a search completion option to which a respective product image is associated, wherein at least one of the set of product search results or the search completion options is a selectable option;

displaying the product purchasing information as part of the first overlay, the product purchasing information including a price of the respective search completion option;

displaying, with the displayed product images of the first overlay, the set of search completion options as a second overlay above the page of content with the search interface element, the search interface element enabling at least one of a selection of one of the search completion options as a search query, a selection of one of the displayed product images, or removal of the displayed product images and the displayed set of search completion options from the search interface element to engage the page of content of the electronic marketplace;

displaying a history section as a third overlay above the page of content, wherein the first overlay, the second overlay, and the third overlay are displayed concurrently on a partially transparent chalkboard interface superimposed over the page of content, the history section including at least one selectable visual identifier representing a previous state of the chalkboard interface or a previous chalkboard interface, the selectable visual identifier including a map that maps the text input to the corresponding search completion option and the product search result, the map further including a timeline mapping at least one previous text input to a corresponding previous search completion option and previous product search result, such that a selection of the at least one previous text input returns the chalkboard interface to the previous search completion option and the previous product search result, and wherein the at least one previous text input includes at least one previous search refinement;

modifying the graphical appearance of the page of content such that the page of content is visually distinguished from the chalkboard interface; and enabling selection of one or more view options for the chalkboard interface, the view options including a selectable size of the chalkboard interface and a toggle switch to toggle between display of the chalkboard interface and display of the page of content.

2. The computer-implemented method of claim 1, wherein the page of content underlying the chalkboard interface is viewable by a user viewing the chalkboard interface.

3. The computer-implemented method of claim 1, wherein the information for each set of search results comprises explanatory text associated with the search results.

4. The computer-implemented method of claim 1, wherein displaying information for each set of search results comprises displaying the information in a plurality of columns, wherein each column corresponds to the respective search completion option and comprises the information for the search results of the respective search completion option.

5. The computer-implemented method of claim 1, wherein the indication of the respective search completion option is a hyperlink.

6. A computer-implemented method, comprising:

receiving a text input into a search interface element of a page of content, the page of content having a graphical appearance;

displaying, as a first overlay above the page of content, one or more search completion options for the text input;

displaying product purchasing information as part of the first overlay, the product purchasing information including a price of the respective search completion option;

automatically displaying, for the text input, a set of images as a second overlay above the page of content with the one or more search completion options, each image including information for a content object corresponding to a respective search completion option;

displaying a history section as a third overlay above the page of content, wherein the first overlay, the second overlay, and the third overlay are displayed concurrently on a partially transparent chalkboard interface superimposed over the page of content, the history section including at least one selectable visual identifier representing a previous state of the chalkboard interface or a previous chalkboard interface, the selectable visual identifier including a map that maps the text input to the corresponding search completion option and product purchasing information, the map further including a timeline mapping at least one previous text input to a corresponding previous search completion option and previous product purchasing information, such that a selection of the at least one previous text input returns the chalkboard interface to the previous search completion option and the previous product purchasing information, and wherein the at least one previous text input includes at least one previous search refinement;

modifying the graphical appearance of the page of content such that the page of content is visually distinguished from the chalkboard interface;

enabling selection of one or more view options for the chalkboard interface, the view options including a selectable size of the chalkboard interface and a toggle switch to toggle between display of the chalkboard interface and display of the page of content; and enabling at least one of a return to the page of content, selection of one of the search completion options, or selection of a respective content object such that a selected search completion option or a selected content object is provided to an application executing on an electronic device.

7. The computer-implemented method of claim 6, further comprising:

receiving a selection of one of the search completion options or the content objects; and replacing the page of content with detailed information corresponding to the search completion option or the content object selected.

8. The computer-implemented method of claim 6, wherein displaying information for each set of content objects comprises displaying the information in a plurality of columns, wherein each column corresponds to a respective search completion option and comprises the information for the content objects of the respective search completion option.

9. The computer-implemented method of claim 6, wherein the one or more search completion options is a first set of search completion options and wherein the content objects comprise a first set of content objects, and wherein the computer-implemented method further comprises:
receiving a second text input;
displaying a second set of search completion options corresponding to the second text input; and
for each of the second set of search completion options, displaying information for a second set of content objects corresponding to a respective second search completion option.

10. The computer-implemented method of claim 9, further comprising:
prior to receiving the second text input,
retrieving detailed information for at least some of the content objects of the first set of content objects; and
displaying the detailed information for the first set of content objects.

11. The computer-implemented method of claim 6, further comprising:
receiving a hover input, the hover input being associated with one of the selected content object or the selected search completion option.

12. The computer-implemented method of claim 11, further comprising:
displaying detailed information associated with the selected content object or the selected search completion option associated with the hover input, the detailed information being displayed as a fourth overlay above the page of content on the chalkboard interface, the fourth overlay positioned a predetermined distance from the hover input.

13. The computer-implemented method of claim 11, wherein the one or more search completion options is a first set of search completion options and wherein the content objects comprise a first set of content objects, and wherein the computer-implemented method further comprises:
in response to receiving the hover input, determining whether the hover input is detected for at least a predetermined time period;
in response to determining the hover input is detected for at least the predetermined time period, transmitting the selected content object or the selected search completion option associated with the hover input to a completion service;
receiving, from a search completion service, a second set of search completion options based on the selected content object or the selected search completion option associated with the hover input; and
replacing the information for the first set of content objects corresponding to the respective search completion option of the first set of search completion options with information for a second set of content objects corresponding to a respective second search completion option of the second set of search completion options.

14. The computer-implemented method of claim 6, wherein the one or more search completion options are received from a search completion service.

15. The computer-implemented method of claim 6, wherein a number of content objects displayed is based at least on a size of a display screen of the electronic device.

16. The computer-implemented method of claim 6, wherein the text input is at least a first keystroke corresponding to a search query typing.

17. A system for displaying search results of search completions, the system comprising:
a processor; and
a memory device including instructions that, when executed by the processor, cause the processor to:
receive a text input into a search interface element of a page of content, the page of content having a graphical appearance;
display one or more search completion options for the text input as a first overlay above the page of content;
display product purchasing information as part of the first overlay, the product purchasing information including a price of the respective search completion option;
display, for the text input, a set of images as a second overlay above the page of content with the one or more search completion options, each image including information for content object corresponding to a respective search completion option;
display a history section as a third overlay above the page of content, wherein the first overlay, the second overlay, and the third overlay are displayed concurrently on a partially transparent chalkboard interface superimposed over the page of content, the history section including at least one selectable visual identifier representing a previous state of the chalkboard interface or a previous chalkboard interface, the selectable visual identifier including a map that maps the text input to the corresponding search completion option and product purchasing information, the map further including a timeline mapping at least one previous text input to a corresponding previous search completion option and previous product purchasing information, such that a selection of the at least one previous text input returns the chalkboard interface to the previous search completion option and the previous product purchasing information, and wherein the at least one previous text input includes at least one previous search refinement;
modify the graphical appearance of the page of content such that the page of content is visually distinguished from the chalkboard interface;
enable selection of one or more view options for the chalkboard interface, the view options including a selectable size of the chalkboard interface and a toggle switch to toggle between display of the chalkboard interface and display of the page of content; and
enable at least one of a return to the page of content, selection of one of the search completion options, or selection of a respective content object such that a selected search completion option or a selected content object is provided to an application executing on an electronic device.

18. The system of claim 17, wherein the instructions that, when executed by the processor, cause the processor to display information for each set of content objects comprises instructions to: display the information in a plurality of columns, wherein each column corresponds to a respective search completion option and comprises the information for the content objects of the respective search completion option.

19. The system of claim 17, wherein the one or more search completion options is a first set of completion and wherein the content objects comprise a first set of content objects, and wherein the memory device includes further instructions that, when executed by the processor, cause the processor to:
  receive a second text input;
  display a second set of search completion options corresponding to the second text input; and
  for each of the second set of search completion options, display information for a second set of content objects corresponding to a respective second search completion option.

20. A computer program product for displaying search results of search completions, the program being embedded in a non-transitory computer-readable medium and including instructions that, when executed by at least one computing device, cause the at least one computing device to:
  receive a text input into a search interface element of a page of content, the page of content having a graphical appearance;
  display one or more search completion options for the text input as a first overlay above the page of content;
  display product purchasing information as part of the first overlay, the product purchasing information including a price of the respective search completion option;
  display, for the text input, a set of images as a second overlay above the page of content with the one or more search completion options, each image including information for a content object corresponding to a respective search completion option;
  display a history section as a third overlay above the page of content, wherein the first overlay, the second overlay, and the third overlay are displayed concurrently on a partially transparent chalkboard interface superimposed over the page of content, the history section including at least one selectable visual identifier representing a previous state of the chalkboard interface or a previous chalkboard interface, the selectable visual identifier including a map that maps the text input to the corresponding search completion option and product purchasing information, the map further including a timeline mapping at least one previous text input to a corresponding previous search completion option and previous product purchasing information, such that a selection of the at least one previous text input returns the chalkboard interface to the previous search completion option and the previous product purchasing information, and wherein the at least one previous text input includes at least one previous search refinement;
  modify the graphical appearance of the page of content such that the page of content is visually distinguished from the chalkboard interface;
  enable selection of one or more view options for the chalkboard interface, the view options including a selectable size of the chalkboard interface and a toggle switch to toggle between display of the chalkboard interface and display of the page of content; and
  enable at least one of a return to the page of content, selection of one of the search completion options, or selection of a respective content object such that a selected search completion option or a selected content object is provided to an application executing on an electronic device.

21. The computer program product of claim 20, further comprising instructions that, when executed by at least one computing device, cause the at least one computing device to:
  receive a second text input;
  display a second set of search completion options corresponding to the second text input; and
  for each of the second set of search completion options, display information for a second set of content objects corresponding to a respective second search completion option.

22. The computer program product of claim 20, wherein the instructions that, instructions that, when executed by at least one computing device, cause the at least one computing device to display information for each set of content objects comprises instructions to: display the information in a plurality of columns, wherein each column corresponds to a respective search completion option and comprises the information for the content objects of the respective search completion option.

* * * * *